(12) United States Patent
Tseng et al.

(10) Patent No.: US 12,457,419 B2
(45) Date of Patent: Oct. 28, 2025

(54) OPTICAL IMAGE CAPTURE APPARATUS

(71) Applicant: GUANGZHOU LUXVISIONS INNOVATION TECHNOLOGY LIMITED, Guangzhou (CN)

(72) Inventors: Cheng-Te Tseng, Guangzhou (CN); Chuan-Hui Liu, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 140 days.

(21) Appl. No.: 18/401,944

(22) Filed: Jan. 2, 2024

(65) Prior Publication Data

US 2024/0414441 A1     Dec. 12, 2024

(30) Foreign Application Priority Data

Jun. 8, 2023 (CN) .......................... 202310680576.6

(51) Int. Cl.
*H04N 23/68* (2023.01)

(52) U.S. Cl.
CPC ................................ *H04N 23/687* (2023.01)

(58) Field of Classification Search
CPC ...... H04N 23/687; G02B 9/12; G02B 15/143; G02B 15/143503; G02B 15/1435; G02B 13/009; G02B 13/0045; G02B 13/0065; G02B 27/0012; G03B 17/17; G03B 30/00; G03B 3/10
USPC .................................................. 348/208.11
See application file for complete search history.

(56) References Cited

U.S. PATENT DOCUMENTS

| | | | | |
|---|---|---|---|---|
| 6,859,332 | B2* | 2/2005 | Nagata | G02B 15/143507 359/846 |
| 6,995,922 | B2* | 2/2006 | Mihara | G02B 15/144515 359/689 |
| 7,180,684 | B1* | 2/2007 | Ori | G02B 15/143105 359/684 |
| 7,515,352 | B2* | 4/2009 | Arai | G02B 15/144113 359/686 |
| 12,050,309 | B2* | 7/2024 | Liu | G02B 13/0045 |
| 12,092,799 | B2* | 9/2024 | Kim | G02B 9/12 |
| 2004/0066561 | A1* | 4/2004 | Nagata | G02B 15/143507 359/676 |

(Continued)

*Primary Examiner* — Pritham D Prabhakher
(74) *Attorney, Agent, or Firm* — Birch, Stewart, Kolasch & Birch, LLP

(57) ABSTRACT

An optical image capture apparatus includes a front lens group, an optical redirecting assembly, a fixed lens group, a focusing lens module, and an image sensor. The optical redirecting assembly includes an optical redirecting component which has an incident surface, a reflective surface, and an emergent surface. The front lens group's contact portion is in contact with the incident surface, an incident axis passes through the incident surface, be reflected on the reflective surface, and passes through the emergent surface as an emergent axis. The focusing lens module is adjacent to the fixed lens group and includes a focusing lens group and an actuator. The fixed lens group and the focusing lens group are aligned with the emergent axis, and the actuator actuates the focusing lens group to move along the emergent axis. The image sensor is adjacent to the focusing lens module and substantially aligned with the emergent axis.

15 Claims, 16 Drawing Sheets

(56) References Cited

U.S. PATENT DOCUMENTS

| | | | |
|---|---|---|---|
| 2004/0201902 A1* | 10/2004 | Mihara | G02B 15/144515 |
| | | | 359/676 |
| 2008/0106800 A1* | 5/2008 | Shin | G02B 15/143503 |
| | | | 359/689 |
| 2013/0335605 A1* | 12/2013 | Kuo | G02B 13/009 |
| | | | 359/689 |
| 2019/0324236 A1* | 10/2019 | Kim | G02B 13/0065 |
| 2021/0063702 A1* | 3/2021 | Kim | G02B 27/0025 |
| 2022/0308322 A1* | 9/2022 | Liu | G02B 13/009 |

* cited by examiner

OPTICAL IMAGE CAPTURE APPARATUS

CROSS-REFERENCE TO RELATED APPLICATION

This non-provisional application claims priority under 35 U.S.C. § 119(a) to Patent Application No. 202310680576.6 filed in China on Jun. 8, 2023, the entire contents of which are hereby incorporated by reference.

BACKGROUND

Technical Field

The present invention relates to an optical image capture apparatus, and in particular, to an optical image capture apparatus with a lens set and an optical redirecting component.

Related Art

Electronic devices such as mobile phones and tablet computers are usually equipped with an optical image capture apparatus for photography. The optical image capture apparatus is generally provided with a plurality of lenses, and zooming is achieved by changing the distance between the lenses so that objects at different distances from the optical image capture apparatus can be clearly imaged in the optical image capture apparatus. Due to limitations in sizes and thicknesses of the electronic devices, a telephoto optical image capture apparatus is difficult to implement on the electronic devices.

SUMMARY

In view of this, the present invention provides an optical image capture apparatus that is configured to provide photography at a longer focal length and increase an amount of incident light for photography.

According to an embodiment, the optical image capture apparatus includes a front lens group, an optical redirecting assembly, a fixed lens group, a focusing lens module, and an image sensor. The front lens group is provided with a contact portion and an incident axis. The optical redirecting assembly includes an optical redirecting component, and the optical redirecting component is provided with an incident surface, a reflective surface, and an emergent surface. The contact portion is substantially in contact with the incident surface, to enable the incident axis to pass through the incident surface, be reflected on the reflective surface, and pass through the emergent surface as an emergent axis. The fixed lens group is substantially in contact with the emergent surface to enable the fixed lens group to be substantially aligned with the emergent axis. The focusing lens module includes a focusing lens group and an actuator, the focusing lens module is adjacent to the fixed lens group and the focusing lens group is substantially aligned with the emergent axis, and the actuator is configured to actuate the focusing lens group to move along the emergent axis. The image sensor is adjacent to the focusing lens module and substantially aligned with the emergent axis.

In an embodiment, the fixed lens group includes a first fixed lens, a second fixed lens, a sleeve, and a bearing member. The second fixed lens is located between the first fixed lens and the optical redirecting assembly, the sleeve fixes the first fixed lens, the second fixed lens, and the bearing member, the bearing member is provided with a bearing portion, and the bearing portion is substantially in contact with the emergent surface to enable the fixed lens group to be substantially aligned with the emergent axis.

In an embodiment, the front lens group includes an incident lens. The incident lens is provided with the contact portion, and the contact portion is substantially in contact with the incident surface to enable the incident surface to be substantially aligned with the incident axis.

In an embodiment, the focusing lens group includes a first focusing lens, a second focusing lens, and a third focusing lens. The first focusing lens, the second focusing lens, and the third focusing lens are sequentially arranged from the adjacent fixed lens group along the emergent axis. The actuator is configured to actuate the first focusing lens, the second focusing lens, and the third focusing lens to move along the emergent axis.

In an embodiment, the actuator is further configured to drive the focusing lens group to generate a corresponding movement on a plane perpendicular to the emergent axis to offset a handshake.

In an embodiment, the optical image capture apparatus includes an anti-hand-shake module. The anti-hand-shake module is connected to the image sensor, and when being driven, the anti-hand-shake module is configured to drive the image sensor to generate a corresponding movement to offset a handshake.

The present invention further provides an optical image capture apparatus. According to an embodiment, the optical image capture apparatus includes a front lens group, an optical redirecting assembly, a fixed lens group, a focusing lens module, and an image sensor. The front lens group is provided with a contact portion and an incident axis. The optical redirecting assembly includes an optical redirecting component, and the optical redirecting component is provided with an incident surface, a reflective surface, and an emergent surface. The contact portion is substantially in contact with the incident surface, to enable the incident axis to pass through the incident surface, be reflected on the reflective surface, and pass through the emergent surface as an emergent axis. The fixed lens group corresponds to the emergent surface to enable the fixed lens group to be substantially aligned with the emergent axis. The focusing lens module includes a focusing lens group and an actuator. The focusing lens module is adjacent to the fixed lens group and the focusing lens group is substantially aligned with the emergent axis. The actuator is configured to actuate the focusing lens group to move along the emergent axis. The image sensor is adjacent to the focusing lens module and substantially aligned with the emergent axis.

DETAILED DESCRIPTION

The following describes the present invention in detail with reference to the accompanying drawings and specific embodiments, but should not be used as a limitation on the present invention.

Figure 1:
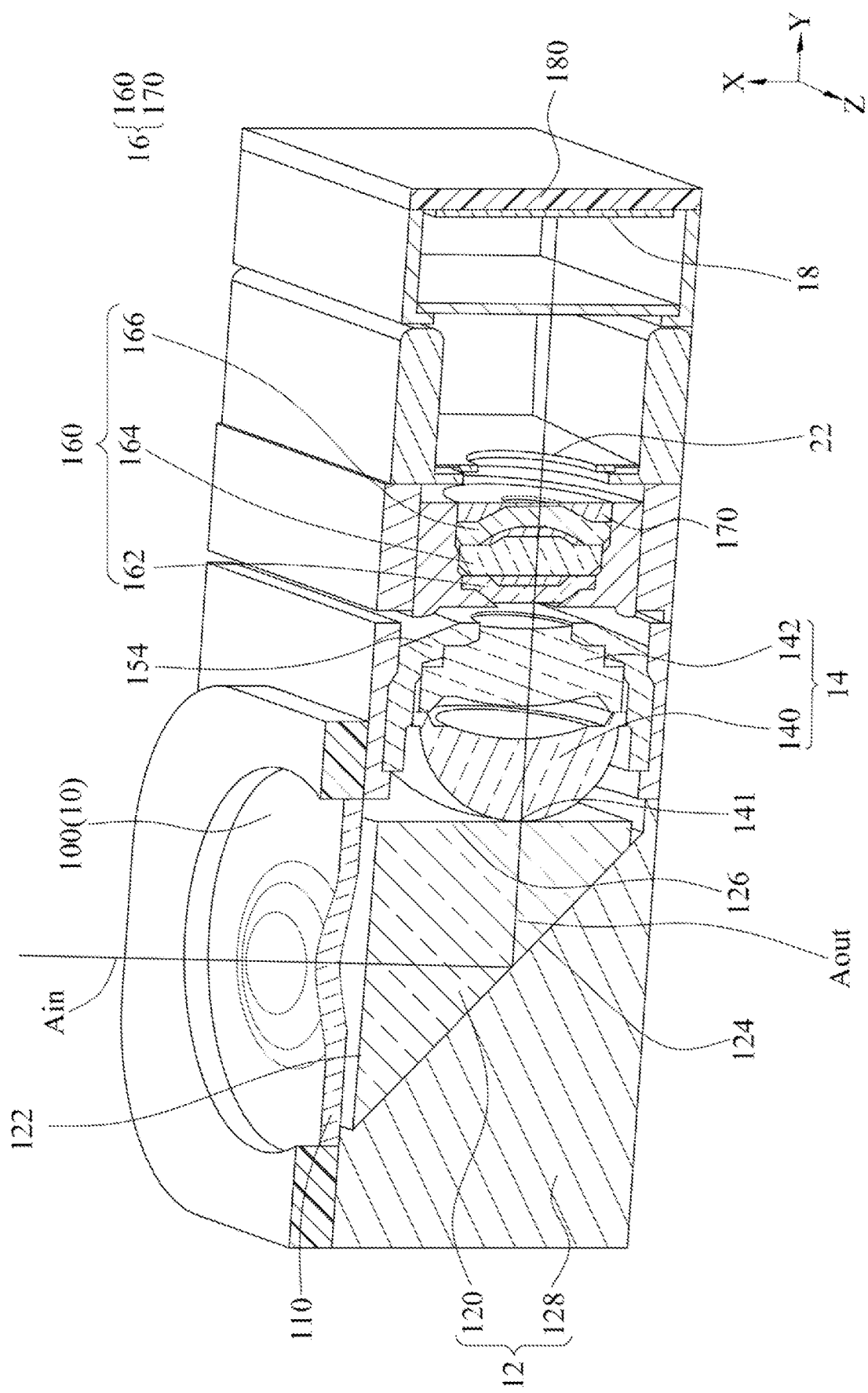
FIG. 1 is a three-dimensional cross-sectional diagram of an optical image capture apparatus according to an embodiment.

Referring to FIG. 1, FIG. 1 is a three-dimensional cross-sectional diagram of an optical image capture apparatus according to an embodiment. The optical image capture apparatus includes a front lens group 10, an optical redirecting assembly 12, a fixed lens group 14, a focusing lens module 16, and an image sensor 18. The front lens group 10 is provided with a contact portion 110 and an incident axis Ain. The optical redirecting assembly 12 includes an optical redirecting component 120, and the optical redirecting component 120 is provided with an incident surface 122, a reflective surface 124, and an emergent surface 126. The incident surface 122 and the emergent surface 126 are mirror surfaces that allow light to pass through, and the reflective surface 124 is a mirror surface that can reflect light incident onto the optical redirecting component 120 at a certain angle to achieve reflection and refraction of the light. The contact portion 110 is substantially in contact with the incident surface 122, to enable the incident axis Ain to pass through the incident surface 122, be reflected on the reflective surface 124, and pass through the emergent surface 126 as an emergent axis Aout.

In some embodiments, the foregoing incident axis Ain is a lens optical axis of the front lens group 10, and represents a center of the incident light from the front lens group 10. The contact portion 110 can be a periphery of the front lens group 10, and the contact portion 110 can be contacted with the optical redirecting component 120 to fix a relative position between the front lens group 10 and the optical redirecting component 120. When the front lens group 10 is substantially in contact with the optical redirecting component 120, a center of the incident surface 122 of the optical redirecting component 120 is aligned with the incident axis Ain, a direction of the light is changed by the reflective surface 124, and the emergent axis Aout represents a changed propagation direction of the light after reflection. In some embodiments, when the incident axis Ain passes through the reflective surface 124 to form the emergent axis Aout, the emergent axis Aout passes through a center of the emergent surface 126. In some embodiments, the optical redirecting component 120 may be implemented by a prism, and the prism may be a right triangular prism. The incident surface 122 and the emergent surface 126 are adjacent to each other and perpendicular to each other, and the reflective surface 124 is an inclined surface.

The fixed lens group 14 is substantially in contact with the emergent surface 126 to enable the fixed lens group 14 to be substantially aligned with the emergent axis Aout. In some embodiments, the fixed lens group 14 may be a group of optical lenses, the optical lenses have respective optical axes, and the optical axes of the lenses are substantially aligned with each other to form an optical axis of the fixed lens group 14. When the fixed lens group 14 is assembled, the optical axis of the fixed lens group 14 is substantially aligned with the emergent axis Aout, so that the optical axis of the fixed lens group 14 and the emergent axis Aout are almost in a straight line.

The focusing lens module 16 includes a focusing lens group 160 and an actuator 170. The focusing lens module 16 is adjacent to the fixed lens group 14. In some embodiments, the focusing lens group 160 may be a group of optical lenses, and the respective optical axes of the optical lenses are substantially aligned with each other to form an optical axis of the focusing lens group 160. The optical axis of the focusing lens group 160 is substantially aligned with the emergent axis Aout, that is, the optical axis of the focusing lens group 160, the optical axis of the fixed lens group 14, and the emergent axis Aout are almost in a straight line. The actuator 170 is adjacent to the focusing lens group 160. The actuator 170 may be located in the lens set center of the focusing lens group 160, or may be located on a periphery, a side, or a bottom portion of the focusing lens group 160. The actuator 170 can actuate the focusing lens group 160 to move along the emergent axis Aout (referring to FIG. 1, move forward and backward in a direction of a Y-axis) to adjust a position or a focal length of the focusing lens group 160 when the image capture apparatus is focused.

The image sensor 18 is adjacent to the focusing lens module 16 and substantially aligned with the emergent axis Aout. The image sensor 18 has a sensing center, and the sensing center corresponds to the emergent axis Aout and is used for receiving light. In some embodiments, the optical image capture apparatus includes an imaging surface 180. The light incident onto the optical image capture apparatus is focused on the imaging surface 180. A size of a sensing surface of the image sensor 18 is substantially the same as or slightly less than a size of the imaging surface 180. The image sensor 18 is located on the imaging surface 180, and the sensing center of the image sensor 18 is substantially aligned with the center of the imaging surface 180. The imaging surface 180 and the emergent axis Aout are perpendicular to each other and have an intersection point, and the center of the imaging surface 180 corresponds to the intersection point.

When the optical image capture apparatus captures an image, imaging light can sequentially pass through the front lens group 10, the optical redirecting assembly 12, the fixed lens group 14, and the focusing lens module 16, and finally be imaged on the image sensor 18. In some embodiments, a thickness and a lens diameter of the front lens group 10 in the optical image capture apparatus can be designed according to the requirements of a designer or a user to increase a light amount of the imaging light running through the front lens group 10 during photography. In addition, through the foregoing structure, the optical image capture apparatus can provide the user with photography at a longer focal length. In some embodiments, if a center point of the image sensor 18 deviates from the emergent axis Aout, after the image sensor 18 receives the imaging light, the imaging quality thereof may be affected and image distortion may occur. Therefore, the imaging quality of the optical image capture apparatus can be maintained through substantial alignment between the image sensor 18 (or the imaging surface 180) and the emergent axis Aout.

Figure 2:
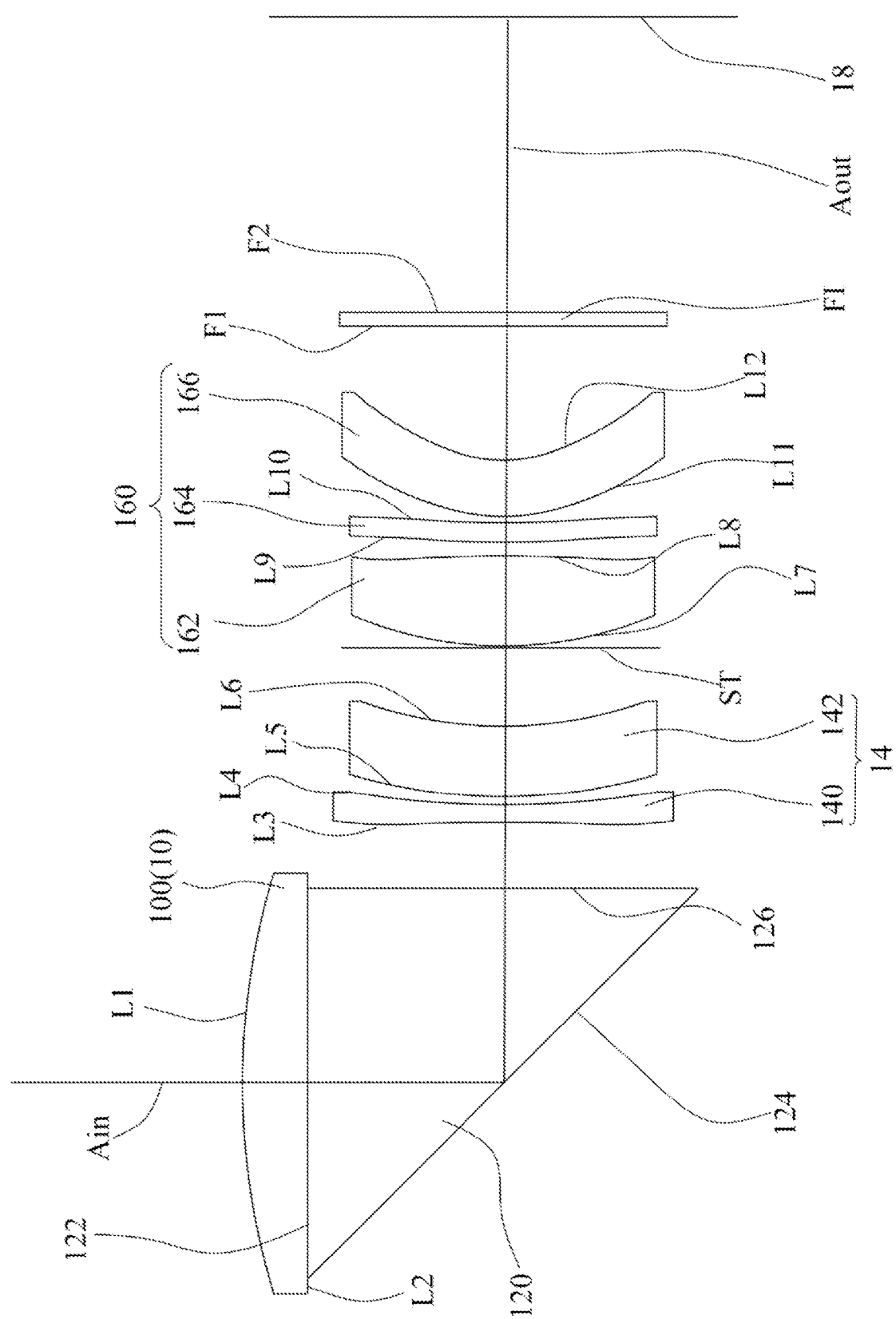
FIG. 2 is a schematic diagram of a lens and an optical redirecting component of an optical image capture apparatus according to an embodiment, and the total quantity of lenses in this embodiment is six.

Referring to FIG. 1 or FIG. 2, FIG. 2 is a schematic diagram of a lens and an optical redirecting component of an optical image capture apparatus according to an embodiment, and the total quantity of lenses in this embodiment is six. In some embodiments, the front lens group 10 includes an incident lens 100, the fixed lens group 14 includes a first fixed lens 140 and a second fixed lens 142, and the focusing lens group 160 includes a first focusing lens 162, a second focusing lens 164, and a third focusing lens 166. Therefore, the total quantity of lenses included in the front lens group 10, the fixed lens group 14, and the focusing lens group 160 is six.

Figure 8A:
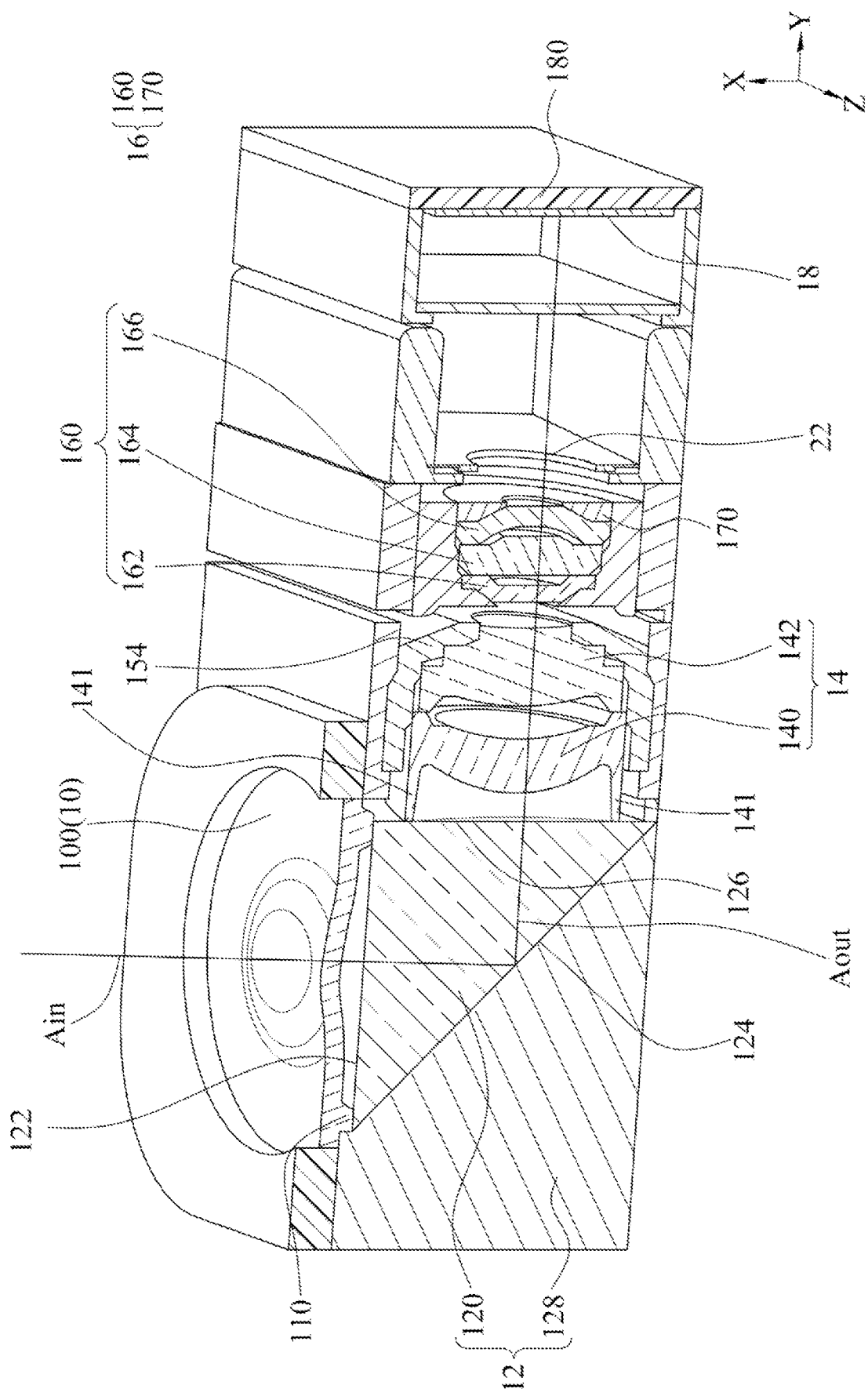
FIG. 8A is a three-dimensional cross-sectional diagram of an optical image capture apparatus according to another embodiment.

The contact portion 110 of the front lens group 10 may be a periphery of the incident lens 100, and the periphery is an edge or an outer edge part of the incident lens 100 (referring to FIG. 1). The incident lens 100 is in contact with the incident surface 122 of the optical redirecting component 120 through the contact portion 110. Referring to FIG. 8A, in some embodiments, the contact portion 110 can be additionally processed at an edge of a surface of the incident lens 100 that faces the optical redirecting component 120 when the incident lens 100 is designed and manufactured, and is in contact with the incident surface 122 of the optical redirecting component 120 through the contact portion 110. The contact portion 110 does not affect an optical characteristic of the incident lens 100. In a case that the periphery of the incident lens 100 is uneven, the contact portion 110 can provide stability of contact between the incident lens 100 and the optical redirecting component 120.

Still referring to FIG. 1 and FIG. 2, lenses have respective optical axes. The optical axis of the incident lens 100 is the incident axis Ain. The center of the incident surface 122 of the optical redirecting component 120 is aligned with the incident axis Ain. The incident axis Ain passes through the incident surface 122, is reflected on the reflective surface 124, and passes through the emergent surface 126 to become the emergent axis Aout.

The first fixed lens 140 is in contact with the emergent surface 126 of the optical redirecting component 120. The second fixed lens 142, the first focusing lens 162, the second focusing lens 164, and the third focusing lens 166 are sequentially arranged from the first fixed lens 140 along the emergent axis Aout, and the optical axes of the first fixed lens 140, the second fixed lens 142, the first focusing lens 162, the second focusing lens 164, and the third focusing lens 166 are all aligned with the emergent axis Aout and are substantially aligned with the emergent axis Aout. In other words, the optical axes of the first fixed lens 140, the second fixed lens 142, the first focusing lens 162, the second focusing lens 164, and the third focusing lens 166 and the emergent axis Aout are almost in a straight line, and the straight line is focused on the image sensor 18.

In some embodiments, the incident lens 100, the first fixed lens 140, the second fixed lens 142, the first focusing lens 162, the second focusing lens 164, and the third focusing lens 166 each have a diopter, the diopter of the incident lens 100 is positive, the diopter of the first fixed lens 140 is positive, the diopter of the second fixed lens 142 is positive, the diopter of the first focusing lens 162 is negative, the diopter of the second focusing lens 164 is negative, and the diopter of the third focusing lens 166 is positive. The designer can select a lens with an appropriate diopter from the foregoing diopter range according to the requirements to improve clarity and accuracy of imaging.

Referring to Table 1 below, Table 1 shows, in an embodiment in which the front lens group 10 includes one lens, the fixed lens group 14 includes two lenses, and the focusing lens group 160 includes three lenses, values of curvature radii, mirror surface distances, refractive indexes, and Abbe numbers (Vd) of the incident lens 100, the optical redirecting component 120, the first fixed lens 140, the second fixed lens 142, the first focusing lens 162, the second focusing lens 164, and the third focusing lens 166. The designer can refer to the coefficients in Table 1 to select a suitable lens according to the requirements.

TABLE 1

| Lens | Mirror surface | Curvature radius (millimeter) | Mirror surface distance (millimeter) | Refractive index | Abbe number |
|---|---|---|---|---|---|
| Object | — | Infinity | Infinity | — | — |
| Incident lens | Incident mirror surface L1 | −10.289 | 1.00 | 1.54 | 56.00 |
| Incident lens | Emergent mirror surface L2 | Infinity | 0.00 | — | — |
| Optical redirecting component | Incident surface | Infinity | 6.00 | 1.78 | 25.76 |
| Optical redirecting component | Emergent surface | Infinity | 1.00 | — | — |
| First fixed lens | Incident mirror surface L3 | 71.127 | 0.28 | 1.68 | 18.40 |
| First fixed lens | Emergent mirror surface L4 | 10.981 | 0.13 | — | — |
| Second fixed lens | Incident mirror surface L5 | 15.882 | 1.08 | 1.54 | 56.00 |

TABLE 1-continued

| Lens | Mirror surface | Curvature radius (millimeter) | Mirror surface distance (millimeter) | Refractive index | Abbe number |
|---|---|---|---|---|---|
| Second fixed lens | Emergent mirror surface L6 | 10.893 | 1.23 | — | — |
| Stop surface | — | Infinity | 0.00 | | |
| First focusing lens | Incident mirror surface L7 | 7.152 | 1.39 | 1.54 | 56.00 |
| First focusing lens | Emergent mirror surface L8 | −26.373 | 0.22 | — | — |
| Second focusing lens | Incident mirror surface L9 | 14.970 | 0.29 | 1.69 | 18.40 |
| Second focusing lens | Emergent mirror surface L10 | 28.899 | 0.10 | — | — |
| Third focusing lens | Incident mirror surface L11 | 3.015 | 0.86 | 1.54 | 56.00 |
| Third focusing lens | Emergent mirror surface L12 | 2.046 | 2.06 | — | — |
| Filter | Light incident surface F1 | Infinity | 0.21 | 1.517 | 64.167 |
| Filter | Light emergent surface F2 | Infinity | 5.74 | — | — |
| Image sensor | — | Infinity | — | — | — |

Referring to FIG. 2 together, the lenses in the front lens group 10, the fixed lens group 14, and the focusing lens group 160 have respective incident mirror surfaces L1, L3, L5, L7, L9, and L11 and emergent mirror surfaces L2, L4, L6, L8, L10, and L12. When running through the lenses, the imaging light is incident from the incident mirror surfaces L1, L3, L5, L7, L9, and L11 of the lenses and is emergent from the emergent mirror surfaces L2, L4, L6, L8, L10, and L12. The incident mirror surfaces L1, L3, L5, L7, L9, and L11 and the emergent mirror surfaces L2, L4, L6, L8, L10, and L12 of the lenses, and the incident surface 122, the reflective surface 124 and the emergent surface 126 of the optical redirecting component 120 all have respective curvature radii, refractive indexes, and Abbe numbers, as listed in Table 1 above. In addition, each mirror surface has a center point, and the distances between the center points are shown by the mirror surface distances in Table 1. The mirror surface distance represents the distance between the center point of the mirror surface and the center point of the adjacent next mirror surface. Therefore, the thickness of each lens and the distance relationship between the lenses can be obtained. Since the focusing lens group 160 can be actuated by the actuator 170 to adjust the distance between two of the first focusing lens 162, the second focusing lens 164, and the third focusing lens 166 to focus the optical image capture apparatus, the mirror surface distances between the emergent mirror surface L8 and the incident mirror surface L9, between the emergent mirror surface L10 and the incident mirror surface L11, and between the emergent mirror surface L12 and the light incident surface F1 of the filter can be changed by actuating the focusing lens group 160 by the actuator 170 in this embodiment.

In some embodiments, the optical image capture apparatus may include a stop surface ST and a filter FI. The stop surface ST can be located between the second fixed lens 142 and the first focusing lens 162, is configured to control transmission and distribution of the imaging light, and can prevent the imaging light from being excessively focused or diverged, to ensure the imaging quality and stability of the optical image capture apparatus. The filter FI has a light incident surface F1 and a light emergent surface F2. The filter FI can be located between the third focusing lens 166 and the image sensor 18 and is configured to filter out undesired light on the image sensor 18 to allow only light with a specific wavelength to pass through.

Each of the incident mirror surfaces L1, L3, L5, L7, L9, and L11 and the emergent mirror surfaces L2, L4, L6, L8, L10, and L12 of the front lens group 10, the fixed lens group 14, and the focusing lens group 160 has an aspheric coefficient, and the aspheric coefficient includes a coefficient K and a coefficient A, and is used to represent the curvature change of the curved surface shape of the lens and can correct spherical distortion. The designer can improve the imaging quality of the optical image capture apparatus by selecting a lens with an appropriate aspheric coefficient. In some embodiments, for values of the aspheric coefficients of the incident mirror surfaces L1, L3, L5, L7, L9, and L11 and the emergent mirror surfaces L2, L4, L6, L8, L10, and L12, reference can be made to Table 2 below.

TABLE 2

| Mirror surface | Aspheric coefficient | | | | | | | | | |
|---|---|---|---|---|---|---|---|---|---|---|
| | Coefficient K | A4 | A6 | A8 | A10 | A12 | A14 | A16 | A18 | A20 |
| L1 | 0.00E+00 | −1.37E−04 | 2.74E−05 | −2.83E−06 | 2.43E−07 | −9.92E−09 | 1.60E−10 | 0.00E+00 | 0.00E+00 | 0.00E+00 |
| L3 | 0.00E+00 | −1.16E−02 | 4.81E−03 | −1.06E−03 | 1.37E−04 | −7.69E−06 | 9.90E−09 | 1.09E−08 | 0.00E+00 | 0.00E+00 |
| L4 | 0.00E+00 | −1.83E−02 | 8.64E−03 | −2.43E−03 | 3.66E−04 | −2.57E−05 | 6.44E−07 | 1.56E−09 | 0.00E+00 | 0.00E+00 |
| L5 | 0.00E+00 | 1.10E−03 | 3.83E−03 | −1.45E−03 | 2.18E−04 | −1.19E−05 | −1.29E−08 | 8.49E−09 | 0.00E+00 | 0.00E+00 |
| L6 | 0.00E+00 | 6.81E−03 | −4.29E−04 | 5.73E−05 | −3.10E−05 | 1.97E−06 | 9.06E−07 | −1.14E−07 | 0.00E+00 | 0.00E+00 |
| L7 | 0.00E+00 | 1.66E−01 | 2.99E−02 | 9.74E−04 | −1.23E−03 | −6.92E−04 | 6.70E−04 | 2.79E−04 | 0.00E+00 | 0.00E+00 |
| L8 | 0.00E+00 | 2.57E−01 | 7.78E−02 | −1.41E−02 | −6.65E−03 | −8.32E−03 | −8.26E−04 | −2.25E−03 | 0.00E+00 | 0.00E+00 |

TABLE 2-continued

Aspheric coefficient

| Mirror surface | Coefficient K | A4 | A6 | A8 | A10 | A12 | A14 | A16 | A18 | A20 |
|---|---|---|---|---|---|---|---|---|---|---|
| L9 | 0.00E+00 | −5.11E−02 | 1.96E−02 | 2.00E−02 | −2.82E−03 | −1.81E−03 | −5.87E−04 | −2.41E−03 | 2.84E−03 | 5.50E−04 |
| L10 | 0.00E+00 | −2.55E−02 | −2.66E−02 | 3.04E−02 | −9.00E−03 | 2.81E−03 | −2.61E−03 | −2.38E−03 | 4.12E−04 | 2.71E−05 |
| L11 | 0.00E+00 | −3.97E−01 | 2.92E−05 | 9.03E−03 | −6.93E−03 | 2.38E−03 | −1.70E−03 | 2.44E−04 | −1.50E−05 | −5.72E−05 |
| L12 | 0.00E+00 | −4.10E−02 | 3.06E−02 | −1.61E−03 | −1.19E−03 | −1.45E−03 | −6.10E−04 | −2.73E−04 | −1.55E−04 | −8.07E−05 |

Figure 3A:
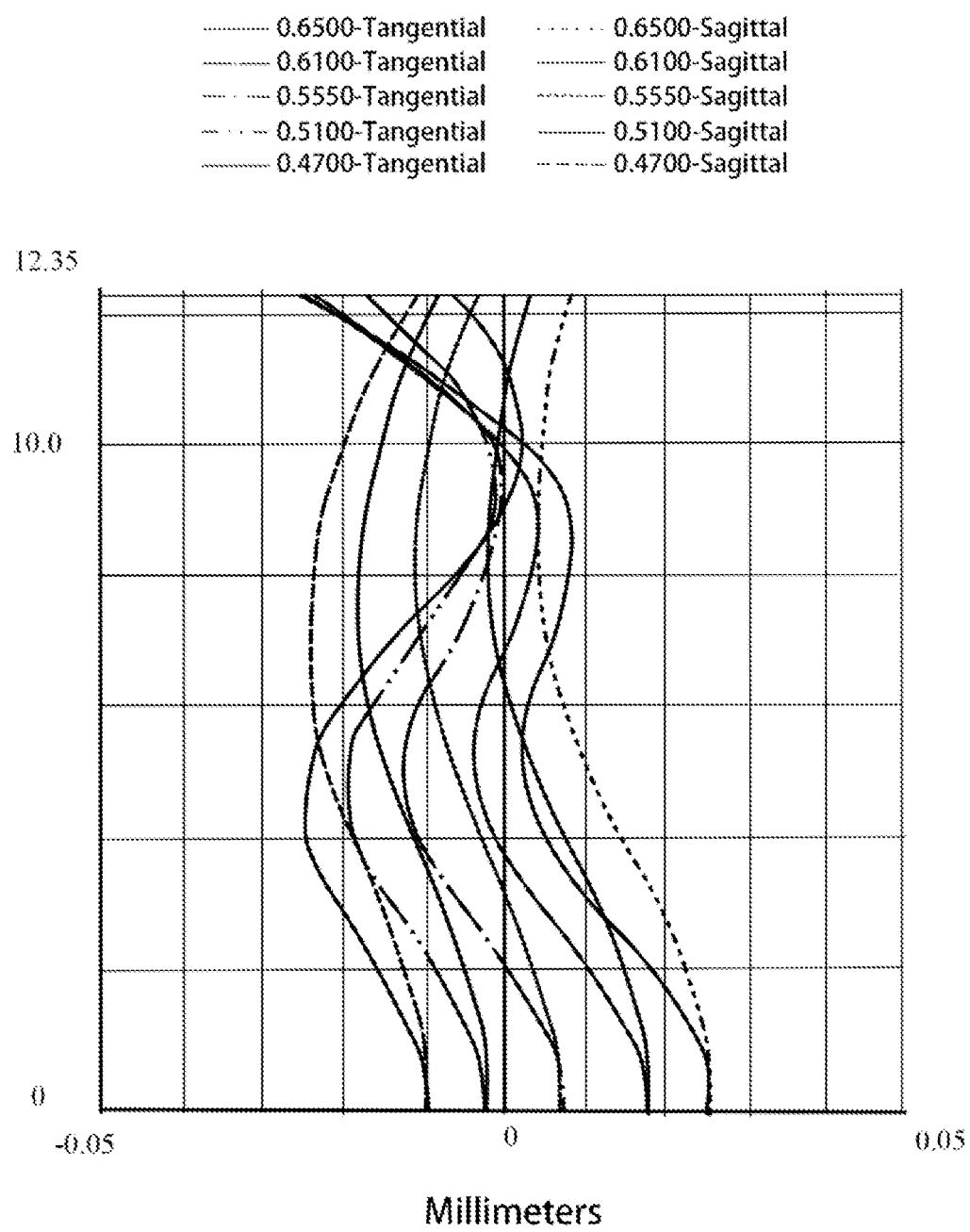
FIG. 3A is a field curvature diagram of an optical image capture apparatus according to the embodiment of FIG. 2.

Referring to FIG. 3A, FIG. 3A is a field curvature diagram of an optical image capture apparatus according to the embodiment of FIG. 2. In the embodiment of the optical image capture apparatus with the coefficients in Table 1 and Table 2 above, it can be seen that the magnitudes of the field curvatures of light with different wavelengths in the embodiment of the optical image capture apparatus show a best focusing position for the different wavelengths in a full field (field of view from the center to the edge of the lens).

Figure 3B:
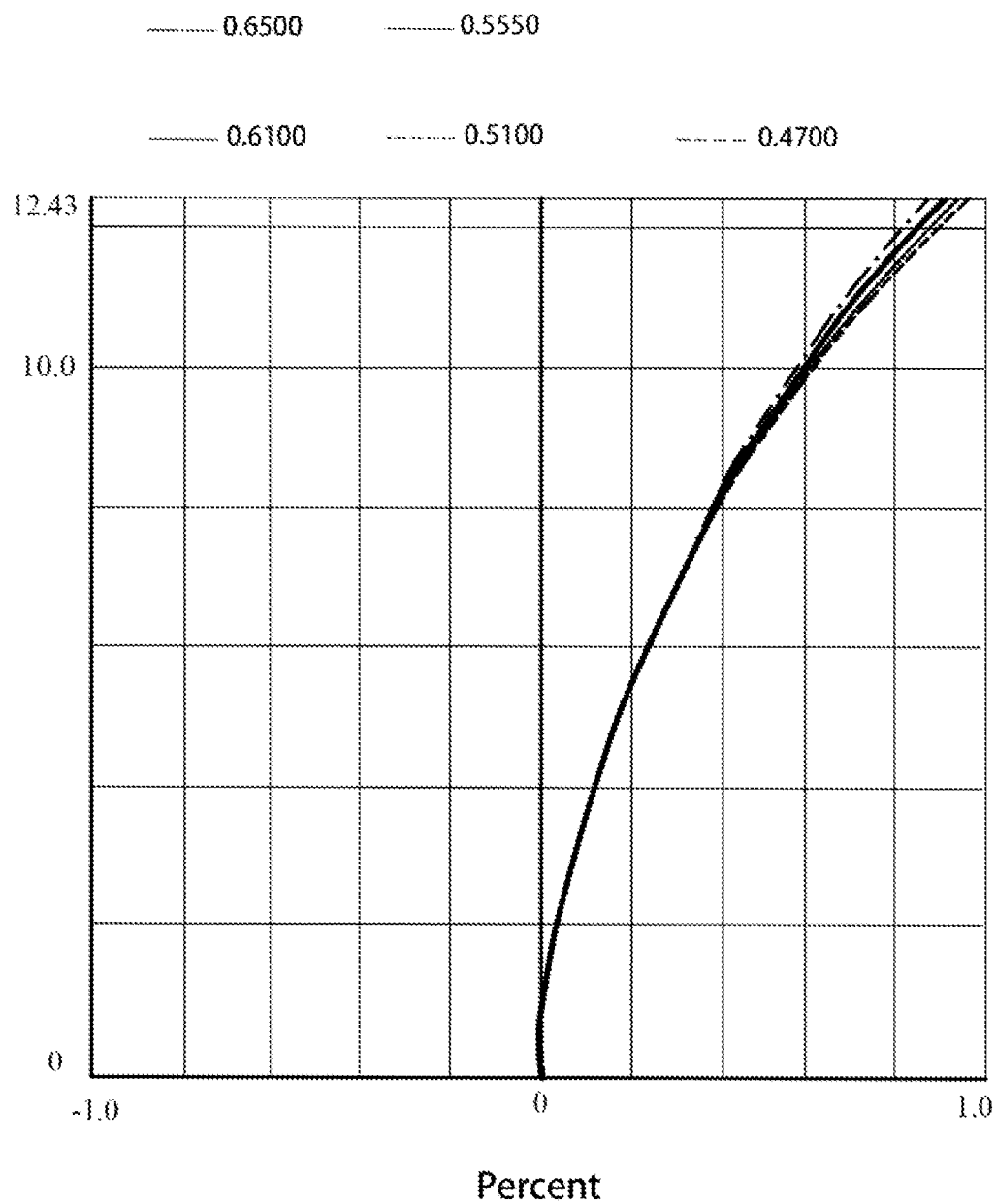
FIG. 3B is a distortion rate diagram of an optical image capture apparatus according to the embodiment of FIG. 2.

Referring to FIG. 3B, FIG. 3B is a distortion rate diagram of an optical image capture apparatus according to the embodiment of FIG. 2. It can be seen that in the foregoing embodiments, the distortion rates of imaging of light at different wavelengths through the optical image capture apparatus are within 1.0%, and the imaging effect is well.

Figure 4:
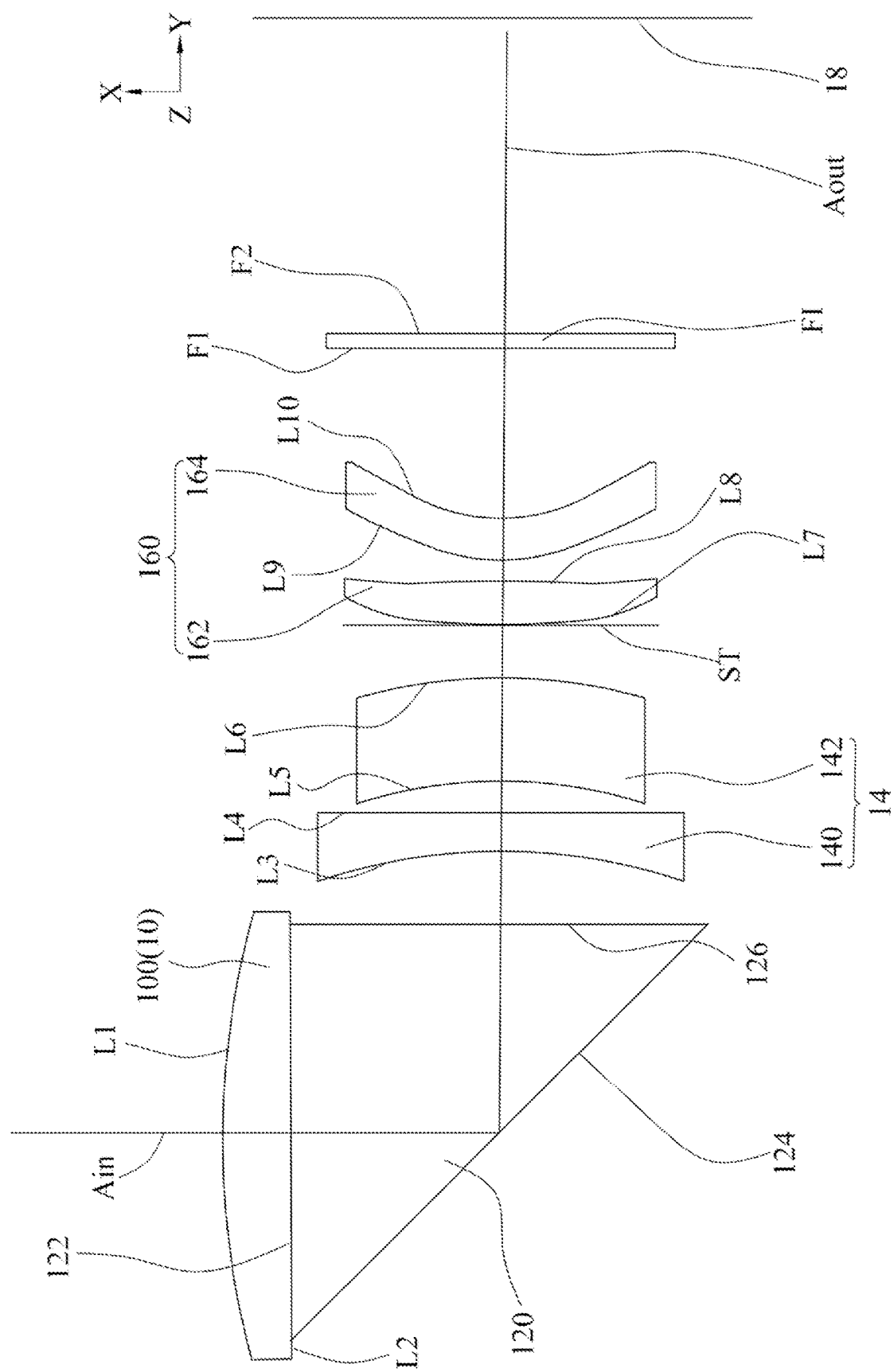
FIG. 4 is a schematic diagram of a lens and an optical redirecting component of an optical image capture apparatus according to an embodiment, and the total quantity of lenses in this embodiment is five.

Referring to FIG. 4, FIG. 4 is a schematic diagram of a lens and an optical redirecting component of an optical image capture apparatus according to an embodiment, and the total quantity of lenses in this embodiment is five. In some other embodiments, the front lens group 10 includes an incident lens 100, the fixed lens group 14 includes a first fixed lens 140 and a second fixed lens 142, and the focusing lens group 160 includes a first focusing lens 162 and a second focusing lens 164. Therefore, the total quantity of lenses included in the front lens group 10, the fixed lens group 14, and the focusing lens group 160 is five.

As described above, the contact portion 110 of the incident lens 100 is in contact with the incident surface 122 of the optical redirecting component 120, the optical axis of the incident lens 100 is the incident axis Ain, and the center of the incident surface 122 is aligned with the incident axis Ain. The incident axis Ain is reflected by the reflective surface 124 and then passes through the emergent surface 126 to form the emergent axis Aout. The first fixed lens 140 is in contact with the emergent surface 126. The second fixed lens 142, the first focusing lens 162, and the second focusing lens 164 are sequentially arranged from the first fixed lens 140.

The optical axes of the first fixed lens 140, the second fixed lens 142, the first focusing lens 162, and the second focusing lens 164 are aligned with the emergent axis Aout, and the optical axes and the emergent axis Aout are substantially aligned with each other and are almost in a straight line, which is finally focused on the image sensor 18.

In some embodiments, the actuator 170 of the focusing lens group 160 actuates the first focusing lens 162 and the second focusing lens 164 to move along the emergent axis Aout (the Y-axis shown in FIG. 4) to focus the optical image capture apparatus.

In some embodiments, the incident lens 100, the first fixed lens 140, the second fixed lens 142, the first focusing lens 162, and the second focusing lens 164 each have a diopter, the diopter of the incident lens 100 is positive, the diopter of the first fixed lens 140 is negative, the diopter of the second fixed lens 142 is positive, the diopter of the first focusing lens 162 is positive, and the diopter of the second focusing lens 164 is negative. The designer can select a lens with an appropriate diopter from the foregoing diopter range according to the requirements to improve clarity and accuracy of imaging.

Refer to Table 3 below, which shows, in an embodiment in which the front lens group 10 includes one lens, the fixed lens group 14 includes two lenses, and the focusing lens group 160 includes two lenses, the values of a curvature radius, a mirror surface distance, a refractive index, and an Abbe number of each lens. The lenses in the front lens group 10, the fixed lens group 14, and the focusing lens group 160 have respective incident mirror surfaces L1, L3, L5, L7, and L9 and emergent mirror surfaces L2, L4, L6, L8, and L10. The meaning represented by each numerical value is described in Table 1 above. The designer can refer to the coefficients in Table 3 to select a suitable lens according to the requirements.

TABLE 3

| Lens | Mirror surface | Curvature radius (millimeter) | Mirror surface distance (millimeter) | Refractive index | Abbe number |
|---|---|---|---|---|---|
| Object | — | Infinity | Infinity | — | — |
| Incident lens | Incident mirror surface L1 | 9.761 | 1.00 | 1.68 | 48.40 |
| Incident lens | Emergent mirror surface L2 | Infinity | 0.00 | — | — |
| Optical redirecting component | Incident surface | Infinity | 6.00 | 1.78 | 25.76 |
| Optical redirecting component | Emergent surface | Infinity | 1.00 | — | — |
| First fixed lens | Incident mirror surface L3 | −29.121 | 0.57 | 1.68 | 18.40 |
| First fixed lens | Emergent mirror surface L4 | 10.334 | 0.46 | — | — |

TABLE 3-continued

| Lens | Mirror surface | Curvature radius (millimeter) | Mirror surface distance (millimeter) | Refractive index | Abbe number |
|---|---|---|---|---|---|
| Second fixed lens | Incident mirror surface L5 | −5.505 | 1.49 | 1.54 | 56.00 |
| Second fixed lens | Emergent mirror surface L6 | −5.690 | 0.75 | — | — |
| Stop surface | — | Infinity | 0.00 | — | — |
| First focusing lens | Incident mirror surface L7 | 9.869 | 0.63 | 1.54 | 56.00 |
| First focusing lens | Emergent mirror surface L8 | −29.516 | 0.30 | — | — |
| Second focusing lens | Incident mirror surface L9 | 2.767 | 0.60 | 1.68 | 18.40 |
| Second focusing lens | Emergent mirror surface L10 | 2.391 | 2.45 | — | — |
| Filter | Light incident surface F1 | Infinity | 0.21 | 1.52 | 64.17 |
| Filter | Light emergent surface F2 | Infinity | 6.04 | — | — |
| Image sensor | — | Infinity | — | — | — |

In some embodiments, the optical image capture apparatus may include a stop surface ST and a filter FI, respectively located between the second fixed lens 142 and the first focusing lens 162 and between the second focusing lens 164 and the image sensor 18.

For the aspheric coefficient of this embodiment, reference can be made to Table 4 below.

TABLE 4

Aspheric coefficient

| Mirror surface | Coefficient K | A4 | A6 | A8 | A10 | A12 | A14 | A16 | A18 | A20 |
|---|---|---|---|---|---|---|---|---|---|---|
| L3 | 0.00E+00 | −1.58E−02 | 4.56E−03 | −1.05E−03 | 1.41E−04 | −7.81E−06 | −8.80E−08 | 1.97E−08 | 0.00E+00 | 0.00E+00 |
| L4 | 0.00E+00 | −2.11E−02 | 8.34E−03 | −2.44E−03 | 3.62E−04 | −2.61E−05 | 7.28E−07 | 2.60E−08 | 0.00E+00 | 0.00E+00 |
| L5 | 0.00E+00 | 4.76E−03 | 3.67E−03 | −1.48E−03 | 2.18E−04 | −1.19E−05 | 2.94E−08 | 3.37E−08 | 0.00E+00 | 0.00E+00 |
| L6 | 0.00E+00 | 5.73E−03 | −2.63E−04 | 1.02E−04 | −2.86E−05 | 1.48E−06 | 7.71E−07 | −9.37E−08 | 0.00E+00 | 0.00E+00 |
| L7 | 0.00E+00 | 9.54E−03 | −9.59E−03 | 8.33E−03 | 2.36E−04 | 7.89E−04 | 9.63E−04 | 0.00E+00 | 0.00E+00 | 0.00E+00 |
| L8 | 0.00E+00 | 1.48E−02 | −1.64E−02 | 8.42E−03 | −6.35E−03 | 1.06E−04 | 1.11E−04 | 0.00E+00 | 0.00E+00 | 0.00E+00 |
| L9 | 0.00E+00 | −4.55E−02 | −5.57E−03 | 1.58E−02 | 3.15E−03 | 4.61E−03 | 2.29E−03 | 8.67E−04 | 1.81E−04 | 0.00E+00 |
| L10 | 0.00E+00 | −3.01E−02 | −3.49E−04 | 8.32E−03 | 1.31E−03 | 1.95E−03 | 1.05E−03 | 2.06E−04 | 1.66E−05 | 0.00E+00 |

Figure 5A:
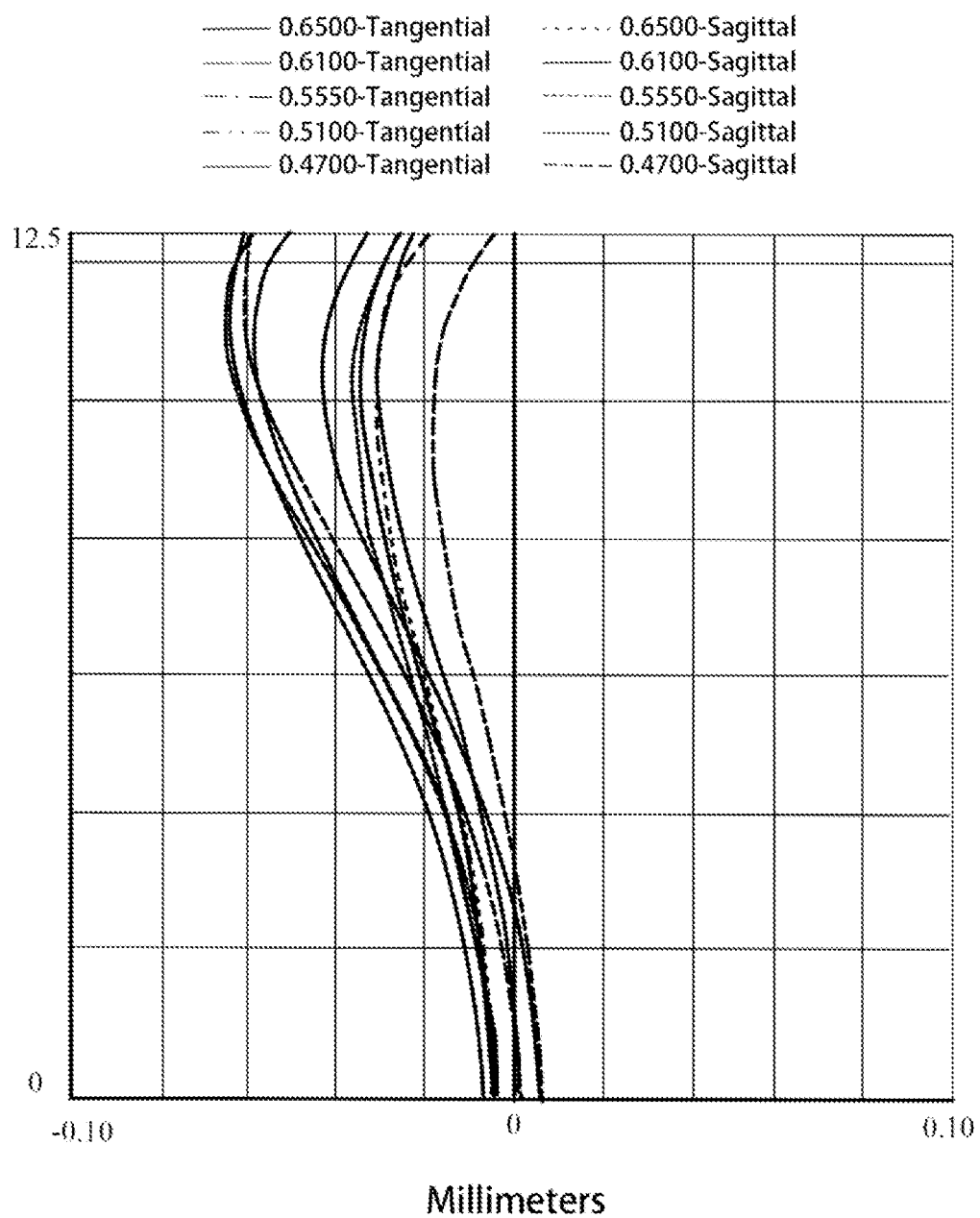
FIG. 5A is a field curvature diagram of an optical image capture apparatus according to the embodiment of FIG. 4.
Figure 5B:
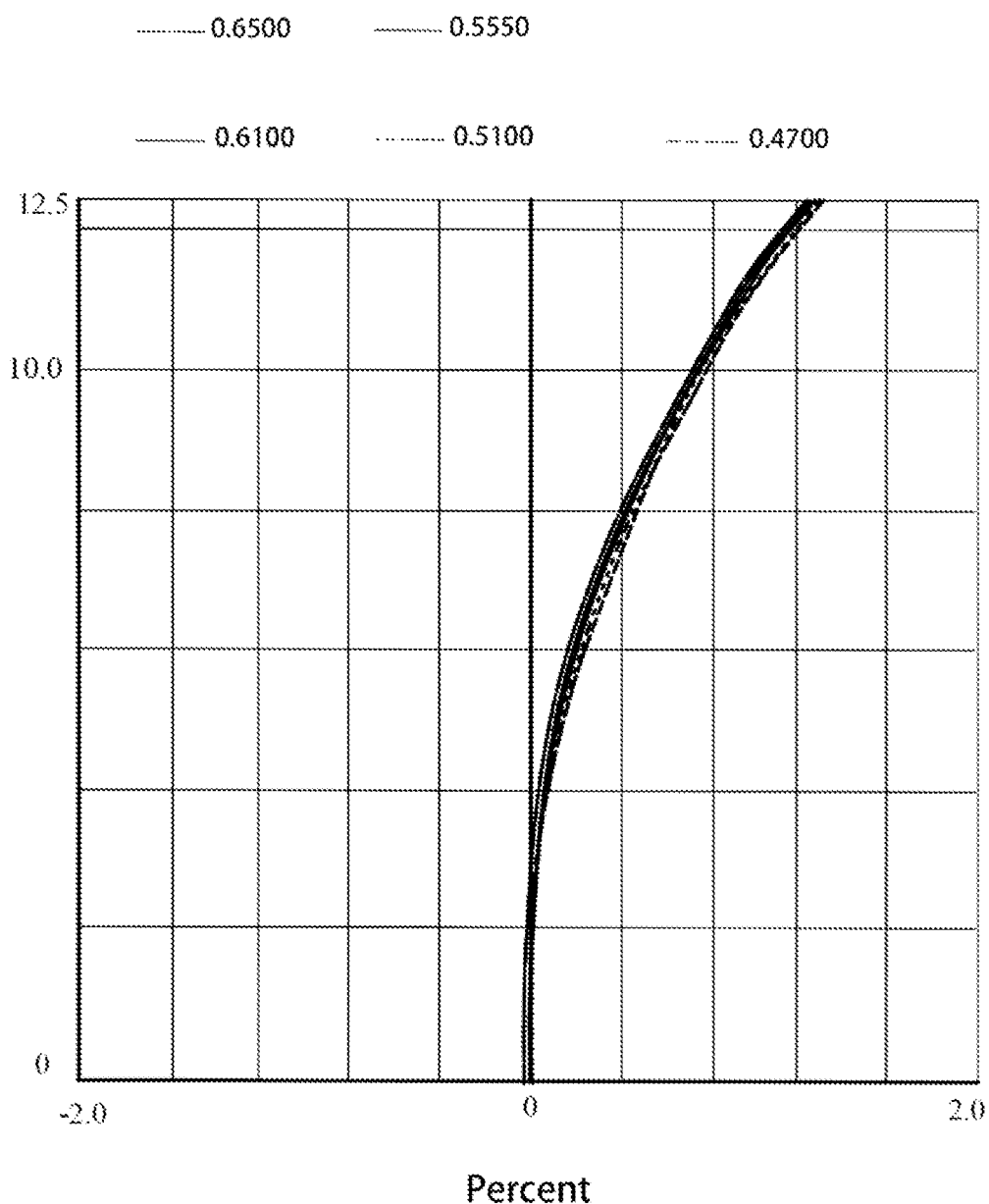
FIG. 5B is a distortion rate diagram of an optical image capture apparatus according to the embodiment of FIG. 4.

Referring to FIG. 5A, FIG. 5A is a field curvature diagram of an optical image capture apparatus according to the embodiment of FIG. 4. In the embodiment of the optical image capture apparatus with the coefficients in Table 3 and Table 4 above, it can be seen that the magnitudes of the field curvatures of light with different wavelengths in the embodiment of the optical image capture apparatus show a best focusing position for the different wavelengths in a full field. Referring to FIG. 5B, FIG. 5B is a distortion rate diagram of an optical image capture apparatus according to the embodiment of FIG. 4. It can be seen that in this embodiment, distortion rates of imaging through the optical image capture apparatus are very low, and the distortion rates of light at different wavelengths are all about 1.2%, which indicates that the optical image capture apparatus can have a good imaging effect.

Figure 6:
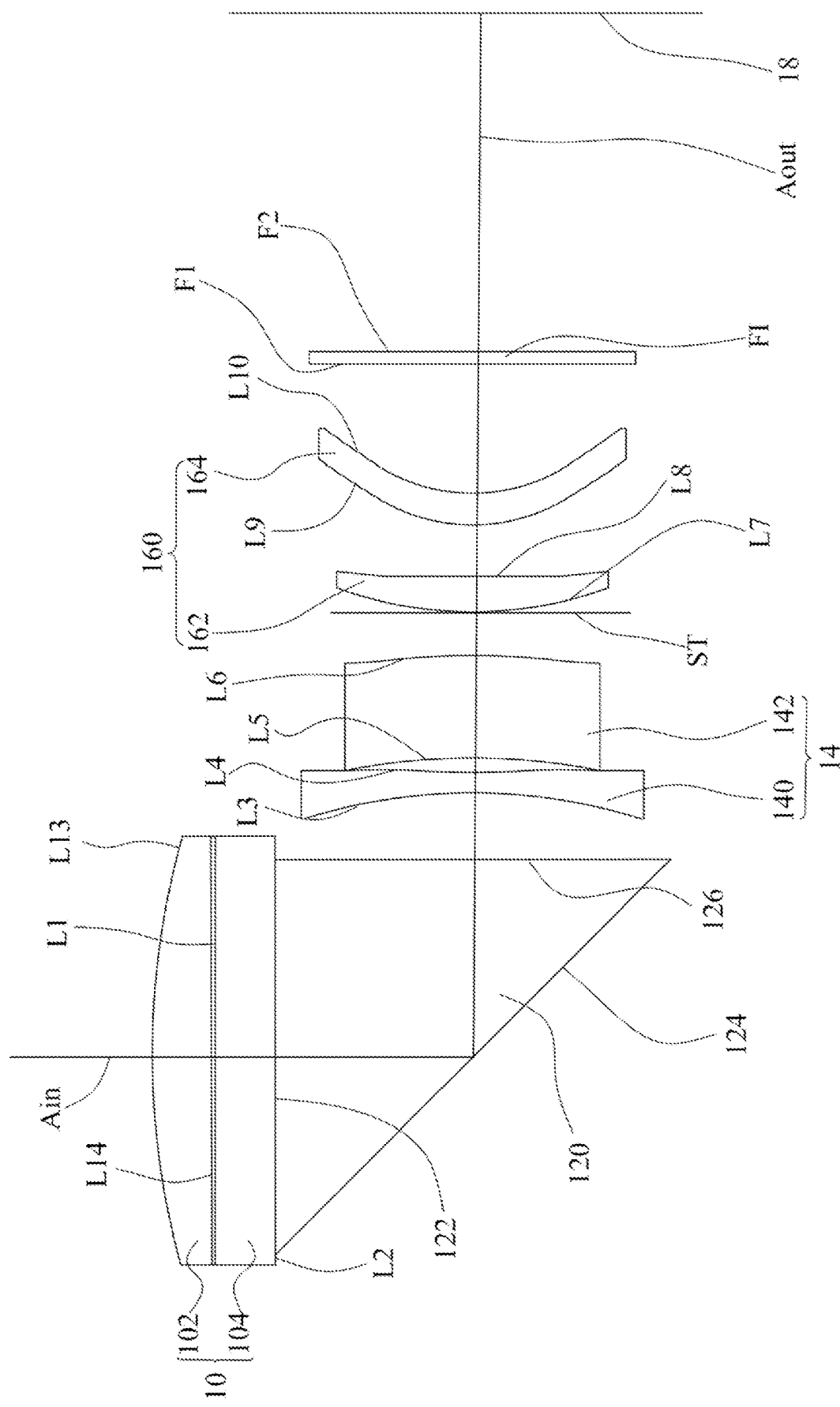
FIG. 6 is a schematic diagram of a lens and an optical redirecting component in another example of an optical image capture apparatus according to an embodiment, and the total quantity of lenses in this embodiment is six.

Referring to FIG. 6, FIG. 6 is a schematic diagram of a lens and an optical redirecting component in another example of an optical image capture apparatus according to an embodiment, and the total quantity of lenses in this embodiment is six. In some other embodiments, the front lens group 10 includes a first incident lens 102 and a second incident lens 104, the fixed lens group 14 includes a first fixed lens 140 and a second fixed lens 142, and the focusing lens group 160 includes a first focusing lens 162 and a second focusing lens 164. Therefore, the total quantity of lenses included in the front lens group 10, the fixed lens group 14, and the focusing lens group 160 is six.

In some embodiments, the second incident lens 104 is located between the first incident lens 102 and the incident surface of the optical redirecting component 120. The first incident lens 102 and the second incident lens 104 each have an optical axis, and the optical axes of the first incident lens 102 and the second incident lens 104 are substantially aligned with each other to form an incident axis Ain. The second incident lens 104 has a contact portion 110, and the incident surface 122 of the optical redirecting component 120 is in contact with the contact portion 110, so that the center of the incident surface 122 is aligned with the incident axis Ain.

In some embodiments, the incident axis Ain is reflected by the reflective surface 124 and then passes through the emergent surface 126 to form an emergent axis Aout. The first fixed lens 140 is in contact with the emergent surface 126. The second fixed lens 142, the first focusing lens 162, and the second focusing lens 164 are sequentially arranged from the first fixed lens 140. The optical axes of the first fixed lens 140, the second fixed lens 142, the first focusing lens 162, and the second focusing lens 164 are aligned with the emergent axis Aout, and the optical axes and the emergent axis Aout are substantially aligned with each other and are almost in a straight line, which is finally focused on the image sensor 18.

In some embodiments, the actuator 170 can actuate the first focusing lens 162 and the second focusing lens 164 to adjust the focal length of the optical image capture apparatus (as described above).

In some embodiments, the first incident lens 102, the second incident lens 104, the first fixed lens 140, the second fixed lens 142, the first focusing lens 162, and the second focusing lens 164 each have a diopter, the diopter of the first incident lens 102 is positive, the diopter of the second incident lens 104 is positive, the diopter of the first fixed lens 140 is negative, the diopter of the second fixed lens 142 is negative, the diopter of the first focusing lens 162 is positive, and the diopter of the second focusing lens 164 is positive. The designer can select a lens with an appropriate diopter from the foregoing diopter range according to the requirements to improve clarity and accuracy of imaging.

Refer to Table 5 below, which shows, in an embodiment in which the front lens group 10 includes two lenses, the fixed lens group 14 includes two lenses, and the focusing lens group 160 includes two lenses, the values of a curvature radius, a mirror surface distance, a refractive index, and an Abbe number of each lens. The lenses in the front lens group 10, the fixed lens group 14, and the focusing lens group 160 have respective incident mirror surfaces L1, L3, L5, L7, L9, and L13 and emergent mirror surfaces L2, L4, L6, L8, L10, and L14. The meaning represented by each numerical value is described in Table 1 above. The designer can refer to the coefficients in Table 5 to select a suitable lens according to the requirements.

TABLE 5

| Lens | Mirror surface | Curvature radius (millimeter) | Mirror surface distance (millimeter) | Refractive index | Abbe number |
| --- | --- | --- | --- | --- | --- |
| Object | — | Infinity | Infinity | — | — |
| First incident lens | Incident mirror surface L13 | 9.741 | 1.00 | 1.63 | 55.47 |
| First incident lens | Emergent mirror surface L14 | Infinity | 0.10 | — | — |
| Second incident lens | Incident mirror surface L1 | 80.000 | 1.00 | 1.52 | 64.17 |
| Second incident lens | Emergent mirror surface L2 | Infinity | 0.00 | — | — |
| Optical redirecting component | Incident surface | Infinity | 6.00 | 1.78 | 25.76 |
| Optical redirecting component | Emergent surface | Infinity | 1.00 | — | — |
| First fixed lens | Incident mirror surface L3 | −30.541 | 0.32 | 1.68 | 18.40 |
| First fixed lens | Emergent mirror surface L4 | 10.443 | 0.22 | — | — |
| Second fixed lens | Incident mirror surface L5 | −7.769 | 1.56 | 1.54 | 56.00 |
| Second fixed lens | Emergent mirror surface L6 | −8.720 | 0.66 | — | — |
| Stop surface | — | Infinity | 0.00 | — | — |
| First focusing lens | Incident mirror surface L7 | 8.540 | 0.53 | 1.54 | 56.00 |
| First focusing lens | Emergent mirror surface L8 | −182.765 | 0.80 | — | — |
| Second focusing lens | Incident mirror surface L9 | 2.570 | 0.47 | 1.68 | 18.40 |
| Second focusing lens | Emergent mirror surface L10 | 2.402 | 1.96 | — | — |
| Filter | Light incident surface F1 | Infinity | 0.21 | 1.517 | 64.167 |
| Filter | Light emergent surface F2 | Infinity | 5.94 | — | — |
| Image sensor | — | Infinity | — | — | — |

In some embodiments, the optical image capture apparatus may include a stop surface ST and a filter FI, respectively located between the second fixed lens 142 and the first focusing lens 162 and between the second focusing lens 164 and the image sensor 18 (as described above).

For the aspheric coefficient of this embodiment reference can be made to Table 6 below.

TABLE 6

| | | | | | | Aspheric coefficient | | | | | |
| --- | --- | --- | --- | --- | --- | --- | --- | --- | --- | --- | --- |
| Mirror surface | Coefficient K | A4 | A6 | A8 | A10 | A12 | A14 | A16 | A18 | A20 | |
| L1 | 0.00E+00 | −1.462E−04 | 2.566E−07 | 1.414E−08 | 8.473E−11 | −1.030E−11 | 0.00E+00 | 0.00E+00 | 0.00E+00 | 0.00E+00 | |
| L3 | 0.00E+00 | −1.62E−02 | 4.56E−03 | −1.05E−03 | 1.41E−04 | −7.79E−06 | −1.03E−07 | 2.15E−08 | 0.00E+00 | 0.00E+00 | |

TABLE 6-continued

Aspheric coefficient

| Mirror surface | Coefficient K | A4 | A6 | A8 | A10 | A12 | A14 | A16 | A18 | A20 |
|---|---|---|---|---|---|---|---|---|---|---|
| L4 | 0.00E+00 | −2.16E−02 | 8.20E−03 | −2.43E−03 | 3.65E−04 | −2.56E−05 | 7.09E−07 | 4.19E−09 | 0.00E+00 | 0.00E+00 |
| L5 | 0.00E+00 | 9.70E−04 | 4.01E−03 | −1.46E−03 | 2.17E−04 | −1.27E−05 | −5.16E−08 | 3.81E−08 | 0.00E+00 | 0.00E+00 |
| L6 | 0.00E+00 | 6.06E−03 | −1.81E−05 | 1.23E−04 | −2.85E−05 | 1.71E−06 | 5.50E−07 | −9.65E−08 | 0.00E+00 | 0.00E+00 |
| L7 | 0.00E+00 | 1.52E−01 | −4.95E−03 | 1.45E−02 | 5.82E−03 | 1.80E−04 | −3.41E−04 | 4.04E−04 | 0.00E+00 | 0.00E+00 |
| L8 | 0.00E+00 | 3.23E−01 | 7.60E−03 | 7.89E−03 | −3.20E−03 | −3.62E−03 | −1.10E−03 | 4.09E−04 | 0.00E+00 | 0.00E+00 |
| L9 | 0.00E+00 | −3.75E−01 | −7.07E−02 | 3.22E−04 | 7.15E−03 | 5.98E−03 | 4.83E−03 | 3.22E−03 | 1.23E−03 | 2.71E−04 |
| L10 | 0.00E+00 | 9.62E−03 | −4.20E−02 | 3.21E−04 | 4.38E−03 | 3.03E−03 | 2.77E−03 | 1.91E−03 | 6.44E−04 | 1.08E−04 |

Figure 7A:
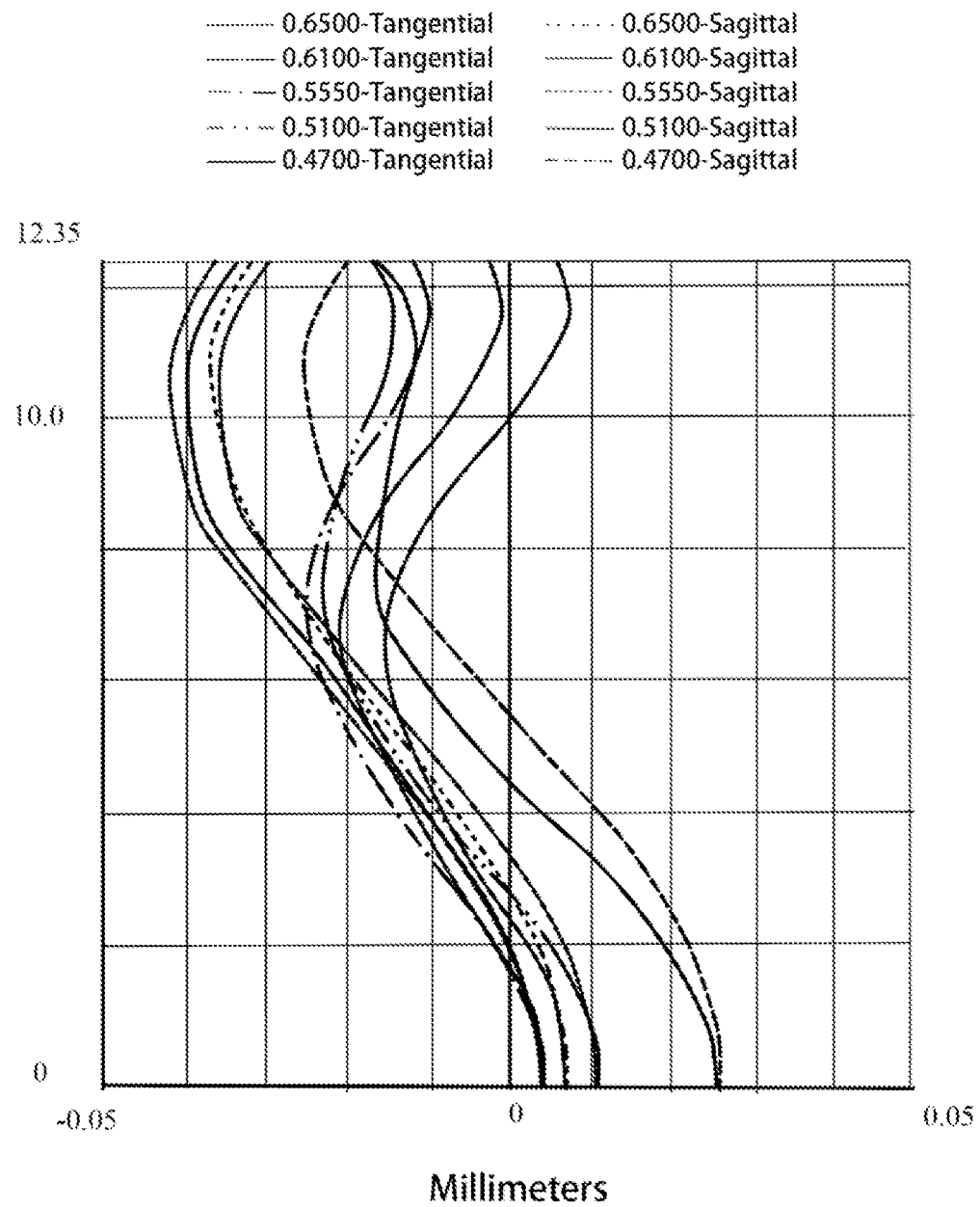
FIG. 7A is a field curvature diagram of an optical image capture apparatus according to the embodiment of FIG. 6.
Figure 7B:
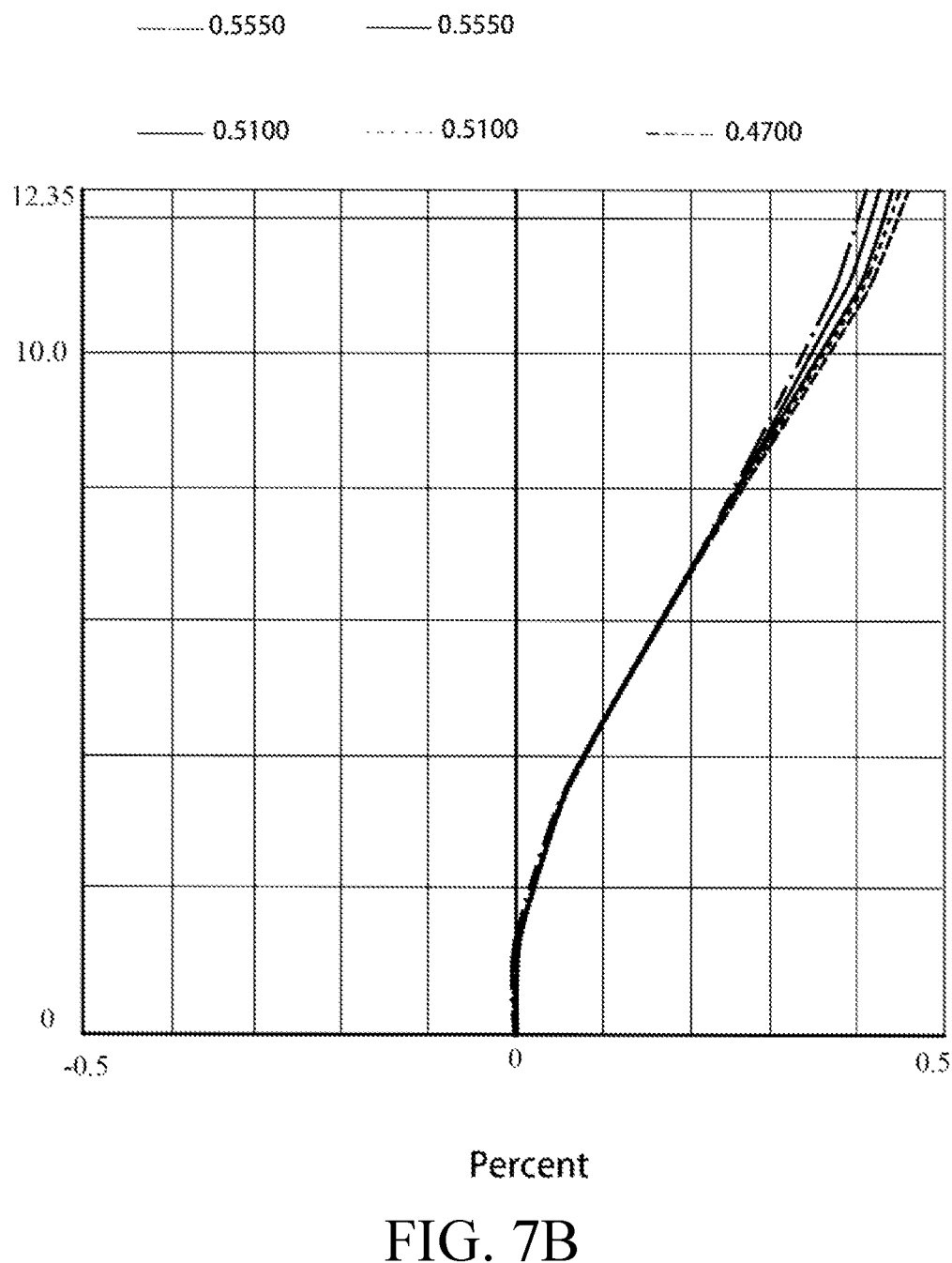
FIG. 7B is a distortion rate diagram of an optical image capture apparatus according to the embodiment of FIG. 6.

Referring to FIG. 7A, FIG. 7A is a field curvature diagram of an optical image capture apparatus according to the embodiment of FIG. 6. In the embodiment of the optical image capture apparatus with the coefficients in Table 5 and Table 6 above, it can be seen that the magnitudes of the field curvatures of light with different wavelengths in the embodiment of the optical image capture apparatus show a best focusing position for the different wavelengths in a full field. Referring to FIG. 7B, FIG. 7B is a distortion rate diagram of an optical image capture apparatus according to the embodiment of FIG. 6. It can be seen that in this embodiment, each distortion rate of imaging through the optical image capture apparatus is within 0.5%, so that the optical image capture apparatus has a good imaging effect.

Still referring to FIG. 1, in some embodiments, that the fixed lens group 14 is substantially in contact with the emergent surface 126 of the optical redirecting component 120 may be that the fixed lens group 14 directly abuts against the emergent surface 126. The first fixed lens 140 is located between the optical redirecting assembly 12 and the second fixed lens 142. The first fixed lens 140 is provided with an abutting portion 141. The abutting portion 141 is in contact with the emergent surface 126 to fix a position of the first fixed lens 140 in a state in which the optical axis of the first fixed lens 140 is aligned with the emergent axis Aout. The abutting portion 141 may be an apex of the first fixed lens 140. If a convex lens is used as the first fixed lens 140, the apex is the highest point of a curved surface of the convex lens (as shown in FIG. 1).

Referring to FIG. 8A, FIG. 8A is a three-dimensional cross-sectional diagram of an optical image capture apparatus according to another embodiment. The abutting portion 141 of the first fixed lens 140 can alternatively be additionally processed around the surface of the first fixed lens 140 that faces the optical redirecting component 120 when the lens is designed and manufactured. In a case that the abutting portion 141 is additionally processed on the first fixed lens 140, the abutting portion 141 is an optically ineffective region, and the abutting portion 141 is only used to ensure that the first fixed lens 140 can be substantially in contact with the optical redirecting component 120 to align the optical axis of the fixed lens group 14 with the emergent axis Aout.

Figure 8B:
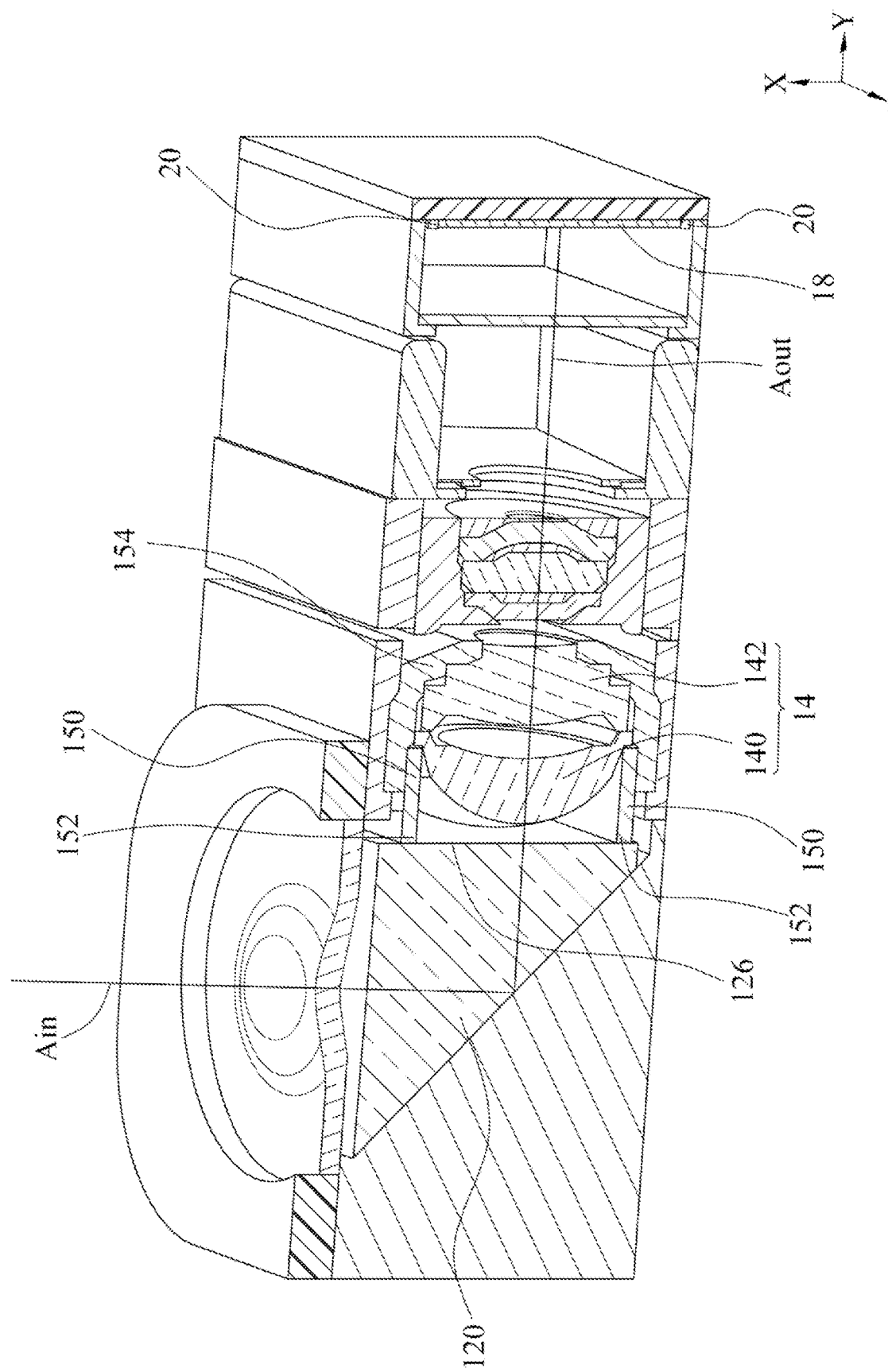
FIG. 8B is a three-dimensional cross-sectional diagram of an optical image capture apparatus according to an embodiment with a bearing member.

Referring to FIG. 8B, FIG. 8B is a three-dimensional cross-sectional diagram of an optical image capture apparatus according to an embodiment with a bearing member. In some embodiments, the fixed lens group 14 may alternatively be substantially in contact with the emergent surface 126 of the optical redirecting component 120 through a bearing member 150. There may be two or more bearing members 150. An end of the bearing member 150 is joined to the first fixed lens 140, another end of the bearing member 150 is provided with a bearing portion 152, and the bearing portion 152 is in contact with the emergent surface 126. The bearing member 150 can maintain relative positions of the first fixed lens 140 and the emergent surface 126 unchanged, so that the optical axis of the first fixed lens 140 and the emergent axis Aout are substantially aligned with each other when the optical image capture apparatus is assembled. In the foregoing embodiment in which the fixed lens group 14 is in contact with the emergent surface 126, a faster and more accurate effect can be achieved during the assembly between the fixed lens group 14 and the optical redirecting component 120.

Referring to FIG. 1 or FIG. 8A and FIG. 8B, in some embodiments, the fixed lens group 14 includes a sleeve 154. The sleeve 154 is configured to fix the first fixed lens 140, the second fixed lens 142, and the bearing member 150 to ensure the mechanical stability of each lens in the lens set. The sleeve 154 can fix the first fixed lens 140, the second fixed lens 142, and the bearing member 150 by threads, negative wedges, brackets, adhesives, and other methods.

Figure 9:
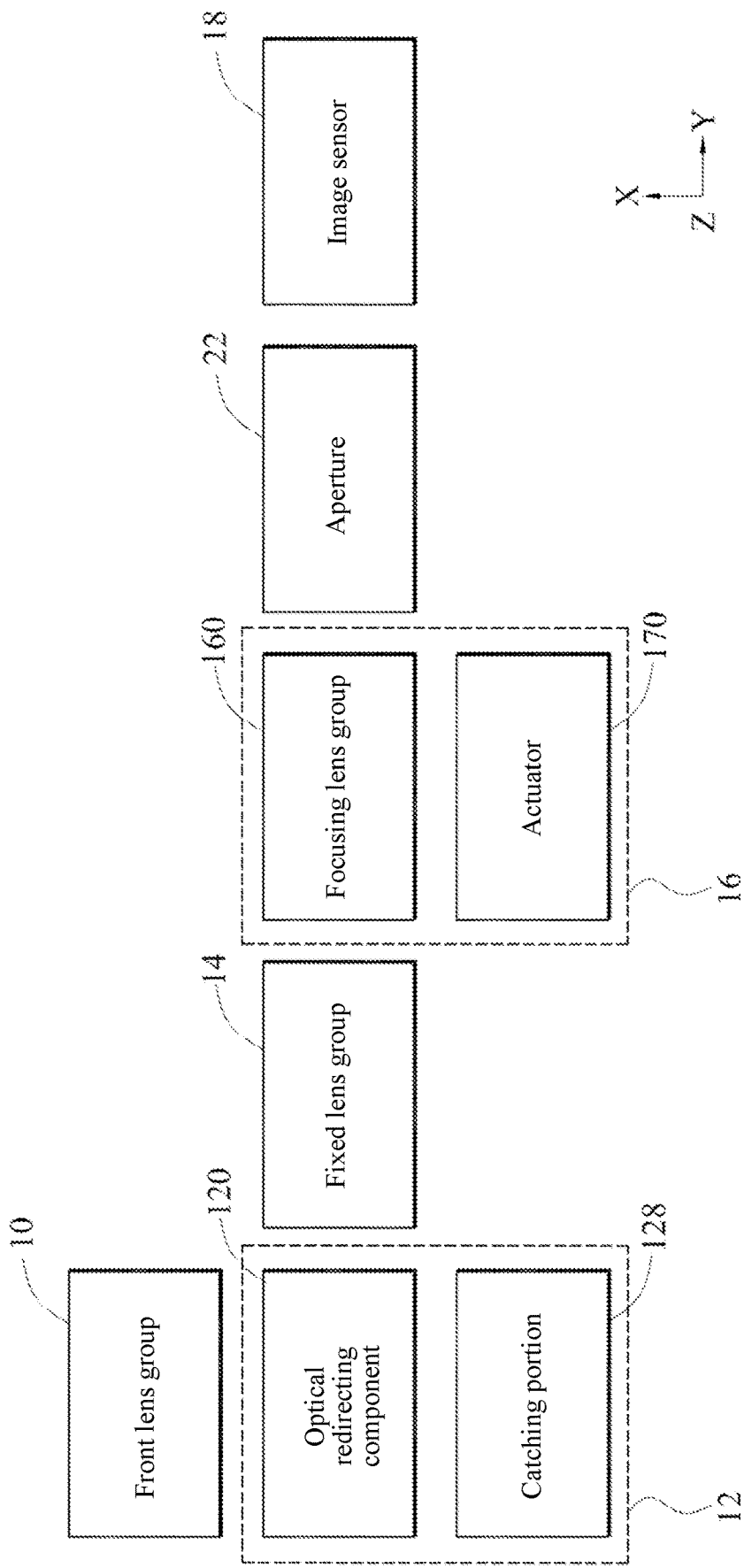
FIG. 9 is a functional block diagram of the embodiment of FIG. 1.

Referring to FIG. 9, FIG. 9 is a functional block diagram of the embodiment of FIG. 1. As described above, in some embodiments, the lens sets or elements through which the imaging light propagates from the front lens group 10 to the image sensor 18 are the front lens group 10, the optical redirecting assembly 12, the fixed lens group 14, the focusing lens module 16, and the image sensor 18 sequentially.

In some embodiments, the optical redirecting assembly 12 includes a catching portion 128. The catching portion 128 is configured to fix the optical redirecting component 120, so that the optical redirecting component 120 can maintain the relative position between the front lens group 10 and the fixed lens group 14.

In some embodiments, the actuator 170 included in the focusing lens module 16 can actuate the focusing lens group 160 to move in the directions of an X-axis, a Y-axis, and a Z-axis. That the actuator 170 actuates the focusing lens group 160 to move on the Y-axis means that the focusing lens group 160 moves along the emergent axis Aout, so that the optical image capture apparatus can be focused when capturing an image, and the actuator 170 drives the focusing lens group 160 to generate a corresponding movement on a plane perpendicular to the emergent axis Aout (that is, in the directions of the X-axis and the Z-axis) to offset vibration of the optical image capture apparatus caused by the user when using the optical image capture apparatus, for example, the handshake of the user.

Figure 10:
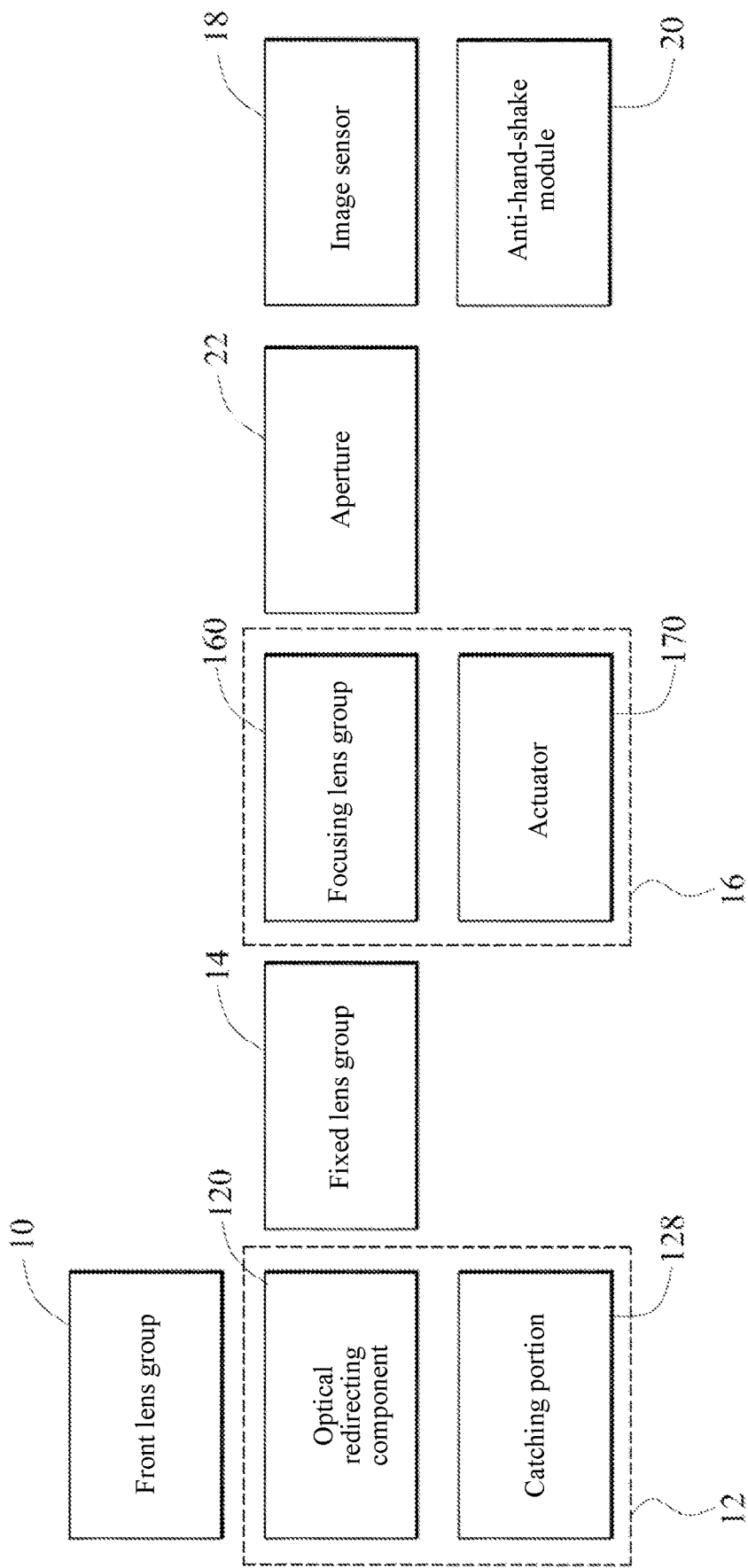
FIG. 10 is a functional block diagram of an example of an optical image capture apparatus with an anti-hand-shake module.

Referring to FIG. 10, FIG. 10 is a functional block diagram of an optical image capture apparatus according to an embodiment with an anti-hand-shake module. In some embodiments, the optical image capture apparatus includes an anti-hand-shake module 20. The anti-hand-shake module 20 is connected to the image sensor 18. The anti-hand-shake module 20 may be located at a bottom portion of the image sensor 18 or adjacent to the image sensor 18 (referring to FIG. 8B). When the anti-hand-shake module 20 is driven, the image sensor 18 can be driven, so that the image sensor 18 generates a corresponding movement. The movement corresponds to vibration generated by the user when using the optical image capture apparatus, such as the foregoing handshake of the user. A direction and a movement distance of the movement correspond to a direction and a distance of the handshake of the user, thereby offsetting the handshake and the impact on imaging quality caused by the vibration. In some embodiments, the anti-hand-shake module 20 can be implemented by sensor shift. Using the anti-hand-shake module 20 to offset the vibration of the optical image capture apparatus can avoid a possibility that the optical axis of the focusing lens group 160 is not aligned with the emergent axis Aout due to the movement of the focusing lens group 160 on the X-axis and the Z-axis.

Referring to FIG. 9 and FIG. 10 together, in some embodiments, the optical image capture apparatus includes an aperture 22. The aperture 22 is located between the focusing lens group 160 and the image sensor 18. A size of the aperture 22 can be changed according to the requirements of the user, thereby affecting a light amount of imaging light that is finally focused on the image sensor 18.

Figure 11:
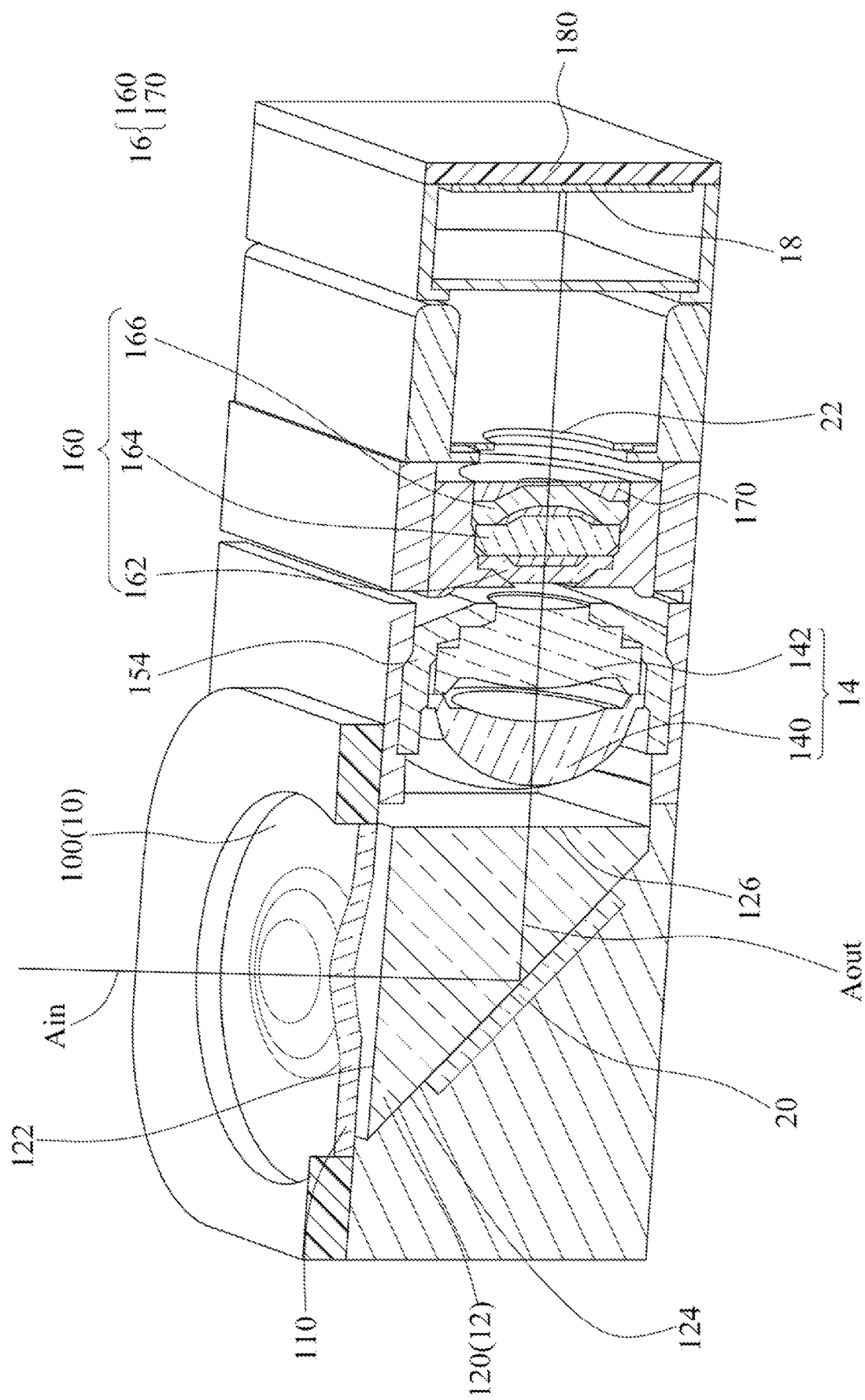
FIG. 11 is a three-dimensional cross-sectional diagram of an example of an optical image capture apparatus in which a fixed lens group corresponds to an emergent surface.

Referring to FIG. 11, FIG. 11 is a three-dimensional cross-sectional diagram of an example of an optical image capture apparatus in which a fixed lens group corresponds to an emergent surface. In some embodiments, the optical image capture apparatus includes a front lens group 10, an optical redirecting assembly 12, a fixed lens group 14, a focusing lens module 16, and an image sensor 18. As described above, the front lens group 10 is provided with a contact portion 110 and an incident axis Ain. The optical redirecting assembly 12 includes an optical redirecting component 120, and the optical redirecting component 120 is provided with an incident surface 122, a reflective surface 124, and an emergent surface 126. The contact portion 110 is substantially in contact with the incident surface 122, to enable the incident axis Ain to pass through the incident surface 122, be reflected on the reflective surface 124, and pass through the emergent surface 126 as an emergent axis Aout.

However, in these embodiments, the fixed lens group 14 corresponds to the emergent surface 126, so that the fixed lens group 14 is substantially aligned with the emergent axis Aout. That the fixed lens group 14 corresponds to the emergent surface 126 means that the fixed lens group 14 is not contacted with the emergent surface 126. In some embodiments, the fixed lens group 14 can maintain a position of the fixed lens group 14 in the form of a sleeve 154.

In addition, the focusing lens module 16 includes a focusing lens group 160 and an actuator 170, the focusing lens module 16 is adjacent to the fixed lens group 14 and the focusing lens module 16 is substantially aligned with the emergent axis Aout, and the actuator 170 is configured to actuate the focusing lens group 160 to move along the emergent axis Aout. As described above, that the fixed lens group 14 and the focusing lens group 160 are aligned with the emergent axis Aout means that the optical axes of the fixed lens group 14 and the focusing lens group 160 and the emergent axis Aout are substantially aligned with each other and are almost in a straight line. The actuator 170 in the focusing lens module 16 can actuate the focusing lens group 160 to move along the emergent axis Aout to focus. The optical axes of the fixed lens group 14 and the focusing lens group 160 and the emergent axis Aout correspond to the center of the image sensor 18 adjacent to the focusing lens module 16.

Still referring to FIG. 2, in some embodiments, the front lens group 10 includes an incident lens 100, the fixed lens group 14 includes a first fixed lens 140 and a second fixed lens 142, and the focusing lens group 160 includes a first focusing lens 162, a second focusing lens 164, and a third focusing lens 166. The incident surface 122 of the optical redirecting component 120 is aligned with the incident axis Ain of the front lens group 10. The first fixed lens 140, the second fixed lens 142, the first focusing lens 162, the second focusing lens 164, and the third focusing lens 166 are sequentially arranged from the corresponding emergent surface 126 along the emergent axis Aout and are substantially aligned with the emergent axis Aout.

Still referring to FIG. 4, in some embodiments, the front lens group 10 includes an incident lens 100, the fixed lens group 14 includes a first fixed lens 140 and a second fixed lens 142, and the focusing lens group 160 includes a first focusing lens 162 and a second focusing lens 164. The incident surface 122 of the optical redirecting component 120 is aligned with the incident axis Ain of the front lens group 10. The first fixed lens 140, the second fixed lens 142, the first focusing lens 162, and the second focusing lens 164 are sequentially arranged from the corresponding emergent surface 126 along the emergent axis Aout and are substantially aligned with the emergent axis Aout.

Still referring to FIG. 6, in some embodiments, the front lens group 10 includes a first incident lens 102 and a second incident lens 104, the fixed lens group 14 includes a first fixed lens 140 and a second fixed lens 142, and the focusing lens group 160 includes a first focusing lens 162 and a second focusing lens 164. The optical axes of the first incident lens 102 and the second incident lens 104 are substantially aligned with each other to form an incident axis Ain. The incident surface 122 of the optical redirecting component 120 is aligned with the incident axis Ain of the front lens group 10. The first fixed lens 140, the second fixed lens 142, the first focusing lens 162, and the second focusing lens 164 are sequentially arranged from the corresponding emergent surface 126 along the emergent axis Aout and are substantially aligned with the emergent axis Aout.

Still referring to FIG. 9 and FIG. 10, in some embodiments, an anti-hand-shake effect can be achieved by driving the focusing lens group 160 by the actuator 170 to generate a corresponding movement on a plane perpendicular to the emergent axis Aout, or the anti-hand-shake module 20 is connected to the image sensor 18 to enable the image sensor 18 to generate a corresponding movement to offset a handshake.

Figure 12:
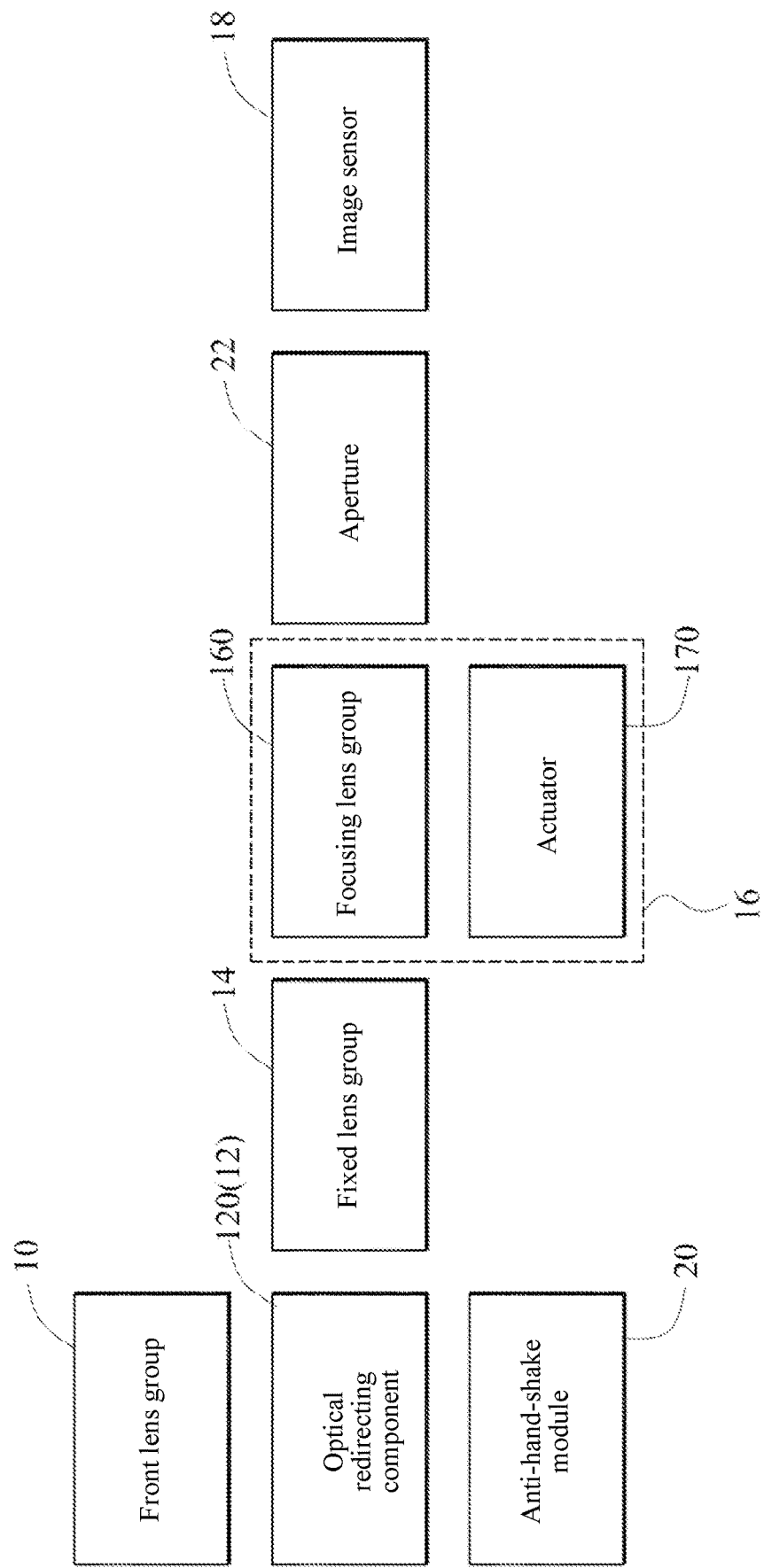
FIG. 12 is a functional block diagram of another example of an optical image capture apparatus with an anti-hand-shake module.

Referring to FIG. 12, FIG. 12 is a functional block diagram of another example of an optical image capture apparatus with an anti-hand-shake module. In some embodiments, the anti-hand-shake module 20 may be located at the optical redirecting assembly 12 (referring to FIG. 11). The anti-hand-shake module 20 is adjacent to the optical redirecting assembly 12. When the optical image capture apparatus has a handshake or a movement similar to the handshake, the anti-hand-shake module 20 actuates the optical redirecting component 120 to generate a movement corresponding to the handshake to offset the handshake. When the optical redirecting component 120 is actuated by the anti-hand-shake module 20 and moves to offset the handshake, since the fixed lens group 14 and the optical redirecting assembly 12 are not contacted with each other, a case that the fixed lens group 14 vibrates and then the optical axes of the lenses of the fixed lens group 14 cannot be substantially aligned with each other to affect the imaging of the optical image capture apparatus is not caused due to the movement of the optical redirecting component 120.

In some embodiments, the optical image capture apparatus including the front lens group 10, the optical redirecting component 120, the fixed lens group 14, and the focusing lens group 160 has an imaging parameter, and the imaging parameter is EFL/F/#, where EFL represents an effective focal length of the optical image capture apparatus, F represents a lens aperture's F-number, and #represents an image format. The imaging parameter can represent light transmission performance and imaging quality of the optical image capture apparatus. In some embodiments, the optical image capture apparatus satisfies that the EFL/F/# is in a range of 5.2 to 6.7.

In some embodiments, the optical image capture apparatus is applicable to an electronic device. The front lens group 10 can be located on a surface of the electronic device and can protrude from the surface of the electronic device to capture the imaging light. An outer diameter of the incident lens 100 of the front lens group 10 and a range of heights protruding from the surface of the electronic device can be adjusted according to settings of the electronic device. For example, a diameter of the front lens group 10 may be greater than 6 millimeters. In some embodiments, in order to increase the amount of incident light of the optical image capture apparatus, heights of the fixed lens group 14 and the focusing lens module 16 along the X-axis may be 7 millimeters, where effective outer diameters of the first fixed lens 140 and the second fixed lens 142 of the fixed lens group 14 may be greater than 5.2 millimeters.

In some embodiments, the incident lens 100, the first incident lens 102, the second incident lens 104, the first fixed lens 140, the second fixed lens 142, the first focusing lens 162, the second focusing lens 164, and the third focusing lens 166 can be implemented by lens types such as a spherical lens, an aspheric lens, a Poisson aspheric lens, a mirror surface lens, a mirror lens, a focal power adjustable lens, and a continuous focal length lens.

In some embodiments, in addition to the optical redirecting component 120 is implemented by a right triangular prism, the reflective surface of the optical redirecting component 120 can also be implemented by a plane mirror, a beam splitter, or the like.

In some embodiments, the actuator 170 may be, but is not limited to, a voice coil motor (VCM), a servo motor, or a piezo motor.

In some embodiments, the image sensor 18 may be a photosensitive device converting photons into electronic signals, such as a CMOS (Complementary Metal-Oxide-Semiconductor) photoreceptor, a CCD (Charge-Coupled Device) photoreceptor, a BSI (Back Side Illuminated) photoreceptor, or the like.

In some embodiments, the electronic device may be a mobile phone, a tablet computer, or other devices.

In conclusion, within the thickness allowed by the design of the electronic device, the optical image capture apparatus may include a front lens group 10, an optical redirecting assembly 12, a fixed lens group 14, a focusing lens module 16, and an image sensor 18 to increase the focal length of the optical image capture apparatus when capturing images and increase the amount of the incident light.

Certainly, the present invention may further have a plurality of other embodiments. A person skilled in the art may make various corresponding changes and variations according to the present invention without departing from the spirit and essence of the present invention. However, such corresponding changes and variations shall fall within the protection scope of the claims appended to the present invention.

What is claimed is:

1. An optical image capture apparatus, comprising:
   a front lens group, comprising a first incident lens and a second incident lens, the second incident lens is located between the first incident lens and the incident surface, the first incident lens and the second incident lens are provided with the incident axis, the second incident lens is provided with the contact portion, and the contact portion is substantially in contact with the incident surface to enable the incident surface to be aligned with the incident axis;
   an optical redirecting assembly, comprising an optical redirecting component, wherein the optical redirecting component is provided with an incident surface, a reflective surface, and an emergent surface, and the contact portion is substantially in contact with the incident surface, to enable the incident axis to pass through the incident surface, be reflected on the reflective surface, and pass through the emergent surface as an emergent axis;
   a fixed lens group, substantially in contact with the emergent surface to enable the fixed lens group to be substantially aligned with the emergent axis, and comprising a first fixed lens and a second fixed lens;
   a focusing lens module, comprising a focusing lens group and an actuator, wherein the focusing lens module is adjacent to the fixed lens group and the focusing lens group is substantially aligned with the emergent axis, and the actuator is configured to actuate the focusing lens group to move along the emergent axis;
   the focusing lens group comprises a first focusing lens, and a second focusing lens; and
   an image sensor, adjacent to the focusing lens module and substantially aligned with the emergent axis;
   wherein the first incident lens, the second incident lens, the first fixed lens, the second fixed lens, the first focusing lens, and the second focusing lens each have a diopter, the diopter of the first incident lens is positive, the diopter of the second incident lens is positive, the diopter of the first fixed lens is negative, the diopter of the second fixed lens is negative, the diopter of the first focusing lens is positive, and the diopter of the second focusing lens is positive.

2. The optical image capture apparatus according to claim 1, wherein the fixed lens group further comprises a sleeve, and a bearing member, the first fixed lens is located between the second fixed lens and the optical redirecting assembly, the sleeve fixes the first fixed lens, the second fixed lens, and the bearing member, the bearing member is provided with a bearing portion, and the bearing portion is substantially in contact with the emergent surface to enable the fixed lens group to be substantially aligned with the emergent axis.

3. The optical image capture apparatus according to claim 1, wherein the first focusing lens and the second focusing lens are sequentially arranged from the adjacent fixed lens group along the emergent axis, and the actuator is configured to actuate the first focusing lens and the second focusing lens to move along the emergent axis.

4. The optical image capture apparatus according to claim 1, further comprising an anti-hand-shake module, wherein the anti-hand-shake module is connected to the image sensor, and when the anti-hand-shake module is driven, the anti-hand-shake module is configured to drive the image sensor to generate a corresponding movement to offset a handshake.

5. The optical image capture apparatus according to claim 4, wherein the actuator is further configured to drive the focusing lens group to generate a corresponding movement on a plane perpendicular to the emergent axis to offset a handshake.

6. The optical image capture apparatus according to claim 5, wherein the optical redirecting assembly further comprises a catching portion, and the catching portion is configured to fix the optical redirecting component.

7. The optical image capture apparatus according to claim 5, further comprising an aperture, wherein the aperture is located between the focusing lens group and the image sensor.

8. The optical image capture apparatus according to claim 1, wherein the first fixed lens is located between the second fixed lens and the optical redirecting assembly, the first fixed lens is provided with an abutting portion, and the abutting portion is substantially in contact with the emergent surface to enable the fixed lens group to be substantially aligned with the emergent axis.

9. An optical image capture apparatus, comprising:
a front lens group, comprising a first incident lens and a second incident lens, the second incident lens is located between the first incident lens and the incident surface, the first incident lens and the second incident lens are provided with the incident axis, the second incident lens is provided with the contact portion, and the contact portion is substantially in contact with the incident surface to enable the incident surface to be aligned with the incident axis;
an optical redirecting assembly, comprising an optical redirecting component, wherein the optical redirecting component is provided with an incident surface, a reflective surface, and an emergent surface, and the contact portion is substantially in contact with the incident surface, to enable the incident axis to pass through the incident surface, be reflected on the reflective surface, and pass through the emergent surface as an emergent axis;
a fixed lens group, corresponding to the emergent surface to enable the fixed lens group to be substantially aligned with the emergent axis, and comprising a first fixed lens and a second fixed lens;
a focusing lens module, comprising a focusing lens group and an actuator, wherein the focusing lens module is adjacent to the fixed lens group and the focusing lens group is substantially aligned with the emergent axis, and the actuator is configured to actuate the focusing lens group to move along the emergent axis;
the focusing lens group comprises a first focusing lens, and a second focusing lens; and
an image sensor, adjacent to the focusing lens module and substantially aligned with the emergent axis;
wherein the first incident lens, the second incident lens, the first fixed lens, the second fixed lens, the first focusing lens, and the second focusing lens each have a diopter, the diopter of the first incident lens is positive, the diopter of the second incident lens is positive, the diopter of the first fixed lens is negative, the diopter of the second fixed lens is negative, the diopter of the first focusing lens is positive, and the diopter of the second focusing lens is positive.

10. The optical image capture apparatus according to claim 9, further comprising an anti-hand-shake module, wherein the anti-hand-shake module is connected to the optical redirecting component, and when being driven, the anti-hand-shake module is configured to drive the optical redirecting component to generate a corresponding movement to offset a handshake.

11. The optical image capture apparatus according to claim 9, wherein the first fixed lens, the second fixed lens, the first focusing lens, and the second focusing lens are sequentially arranged from the corresponding emergent surface along the emergent axis and are substantially aligned with the emergent axis, and the actuator is configured to actuate the first focusing lens and the second focusing lens to move along the emergent axis.

12. An optical image capture apparatus, comprising:
a front lens group, comprising an incident lens, wherein the incident lens is provided with a contact portion and an incident axis;
an optical redirecting assembly, comprising an optical redirecting component, wherein the optical redirecting component is provided with an incident surface, a reflective surface, and an emergent surface, and the contact portion is substantially in contact with the incident surface, to enable the incident axis to pass through the incident surface, be reflected on the reflective surface, and pass through the emergent surface as an emergent axis;
a fixed lens group, substantially in contact with the emergent surface to enable the fixed lens group to be substantially aligned with the emergent axis, and comprising a first fixed lens and a second fixed lens;
a focusing lens module, comprising a focusing lens group and an actuator, wherein the focusing lens module is adjacent to the fixed lens group and the focusing lens group is substantially aligned with the emergent axis, and the actuator is configured to actuate the focusing lens group to move along the emergent axis; the focusing lens group comprises a first focusing lens, a second focusing lens, and a third focusing lens; and
an image sensor, adjacent to the focusing lens module and substantially aligned with the emergent axis;
wherein the incident lens, the first fixed lens, the second fixed lens, the first focusing lens, the second focusing lens, and the third focusing lens each have a diopter, the diopter of the incident lens is positive, the diopter of the first fixed lens is positive, the diopter of the second fixed lens is positive, the diopter of the first focusing lens is negative, the diopter of the second focusing lens is negative, and the diopter of the third focusing lens is positive.

13. An optical image capture apparatus, comprising:
a front lens group, comprising an incident lens, wherein the incident lens is provided with a contact portion and an incident axis;
an optical redirecting assembly, comprising an optical redirecting component, wherein the optical redirecting component is provided with an incident surface, a reflective surface, and an emergent surface, and the contact portion is substantially in contact with the incident surface, to enable the incident axis to pass through the incident surface, be reflected on the reflective surface, and pass through the emergent surface as an emergent axis;
a fixed lens group, substantially in contact with the emergent surface to enable the fixed lens group to be substantially aligned with the emergent axis, and comprising a first fixed lens and a second fixed lens;

a focusing lens module, comprising a focusing lens group and an actuator, wherein the focusing lens module is adjacent to the fixed lens group and the focusing lens group is substantially aligned with the emergent axis, and the actuator is configured to actuate the focusing lens group to move along the emergent axis; the focusing lens group comprises a first focusing lens, and a second focusing lens; and an image sensor, adjacent to the focusing lens module and substantially aligned with the emergent axis;

wherein the incident lens, the first fixed lens, the second fixed lens, the first focusing lens, and the second focusing lens each have a diopter, the diopter of the incident lens is positive, the diopter of the first fixed lens is negative, the diopter of the second fixed lens is positive, the diopter of the first focusing lens is positive, and the diopter of the second focusing lens is negative.

14. An optical image capture apparatus, comprising:

a front lens group, comprising an incident lens, wherein the incident lens is provided with a contact portion and an incident axis;

an optical redirecting assembly, comprising an optical redirecting component, wherein the optical redirecting component is provided with an incident surface, a reflective surface, and an emergent surface, and the contact portion is substantially in contact with the incident surface, to enable the incident axis to pass through the incident surface, be reflected on the reflective surface, and pass through the emergent surface as an emergent axis;

a fixed lens group, corresponding to the emergent surface to enable the fixed lens group to be substantially aligned with the emergent axis, and comprising a first fixed lens and a second fixed lens;

a focusing lens module, comprising a focusing lens group and an actuator, wherein the focusing lens module is adjacent to the fixed lens group and the focusing lens group is substantially aligned with the emergent axis, and the actuator is configured to actuate the focusing lens group to move along the emergent axis; the focusing lens group comprises a first focusing lens, a second focusing lens, and a third focusing lens; and an image sensor, adjacent to the focusing lens module and substantially aligned with the emergent axis;

wherein the incident lens, the first fixed lens, the second fixed lens, the first focusing lens, the second focusing lens, and the third focusing lens each have a diopter, the diopter of the incident lens is positive, the diopter of the first fixed lens is positive, the diopter of the second fixed lens is positive, the diopter of the first focusing lens is negative, the diopter of the second focusing lens is negative, and the diopter of the third focusing lens is positive.

15. An optical image capture apparatus, comprising:

a front lens group, comprising an incident lens, wherein the incident lens is provided with a contact portion and an incident axis;

an optical redirecting assembly, comprising an optical redirecting component, wherein the optical redirecting component is provided with an incident surface, a reflective surface, and an emergent surface, and the contact portion is substantially in contact with the incident surface, to enable the incident axis to pass through the incident surface, be reflected on the reflective surface, and pass through the emergent surface as an emergent axis;

a fixed lens group, corresponding to the emergent surface to enable the fixed lens group to be substantially aligned with the emergent axis, and comprising a first fixed lens and a second fixed lens;

a focusing lens module, comprising a focusing lens group and an actuator, wherein the focusing lens module is adjacent to the fixed lens group and the focusing lens group is substantially aligned with the emergent axis, and the actuator is configured to actuate the focusing lens group to move along the emergent axis; the focusing lens group comprises a first focusing lens, and a second focusing lens; and an image sensor, adjacent to the focusing lens module and substantially aligned with the emergent axis;

wherein the incident lens, the first fixed lens, the second fixed lens, the first focusing lens, and the second focusing lens each have a diopter, the diopter of the incident lens is positive, the diopter of the first fixed lens is negative, the diopter of the second fixed lens is positive, the diopter of the first focusing lens is positive, and the diopter of the second focusing lens is negative.

* * * * *